(12) United States Patent
Benson

(10) Patent No.: US 11,931,865 B2
(45) Date of Patent: Mar. 19, 2024

(54) STEEL GRIT DRYER

(71) Applicant: Roto Grit, LLC, New Franken, WI (US)

(72) Inventor: Ronald Benson, Reno, NV (US)

(73) Assignee: Roto Grit, LLC, New Franken, WI (US)

( * ) Notice: Subject to any disclaimer, the term of this patent is extended or adjusted under 35 U.S.C. 154(b) by 104 days.

(21) Appl. No.: 17/538,997

(22) Filed: Nov. 30, 2021

(65) Prior Publication Data

US 2022/0373259 A1 Nov. 24, 2022

Related U.S. Application Data

(63) Continuation of application No. 16/705,189, filed on Dec. 5, 2019, now Pat. No. 11,187,459.

(60) Provisional application No. 62/775,578, filed on Dec. 5, 2018.

(51) Int. Cl.
| | |
|---|---|
| *B24C 9/00* | (2006.01) |
| *B22F 1/052* | (2022.01) |
| *B22F 1/142* | (2022.01) |
| *F26B 3/06* | (2006.01) |
| *F26B 17/10* | (2006.01) |
| *F26B 25/00* | (2006.01) |

(52) U.S. Cl.
CPC .............. *B24C 9/006* (2013.01); *B22F 1/052* (2022.01); *B22F 1/142* (2022.01); *F26B 3/06* (2013.01); *F26B 17/102* (2013.01); *F26B 25/002* (2013.01); *F26B 2200/08* (2013.01)

(58) Field of Classification Search
CPC ........ F26B 3/06; F26B 17/102; F26B 25/002; F26B 2200/08; F26B 19/005; F26B 3/04; F26B 21/10; F26B 21/12; B24C 9/006; B24C 3/06; B24C 9/00; B22F 1/052; B22F 1/142; B22F 2201/20; Y02P 70/10; C22C 33/02; C22C 2/02
See application file for complete search history.

(56) References Cited

U.S. PATENT DOCUMENTS

| | | |
|---|---|---|
| 5,212,911 A | 5/1993 | Benson |
| 5,520,288 A | 5/1996 | Drenter et al. |
| 8,920,210 B2 | 12/2014 | Benson |
| 9,592,587 B2 | 3/2017 | Benson |
| 2010/0323588 A1 | 12/2010 | Benson |
| 2012/0108147 A1 | 5/2012 | Benson |
| 2014/0120367 A1 | 5/2014 | Warichet et al. |

(Continued)

OTHER PUBLICATIONS

International Search Report corresponding to PCT/US2019/064794 dated Mar. 12, 2020, 5 pages.

*Primary Examiner* — Jessica Yuen
(74) *Attorney, Agent, or Firm* — Foley & Lardner LLP

(57) ABSTRACT

A mobile steel grit dryer used to dry steel grit may be configured with a number of different functions and features to assist a contractor in performing steel or other structure maintenance when using steel grit in resurfacing the structure. The steel grit dryer may be configured with a heat process vacuum bypass so that an off-board vacuum, such as a vacuum on a grit recycling system, may be utilized as opposed to having an onboard vacuum. The dryer may include multiple modes so that an operator may use different modes for different environmental conditions. An exoframe may provide for better durability when being transported to different jobsites. A variety of automation and safety features may also be provided to simplify and improve safety for operators.

8 Claims, 24 Drawing Sheets

(56) References Cited

U.S. PATENT DOCUMENTS

2015/0273660 A1 10/2015 Benson
2017/0297169 A1 10/2017 Benson

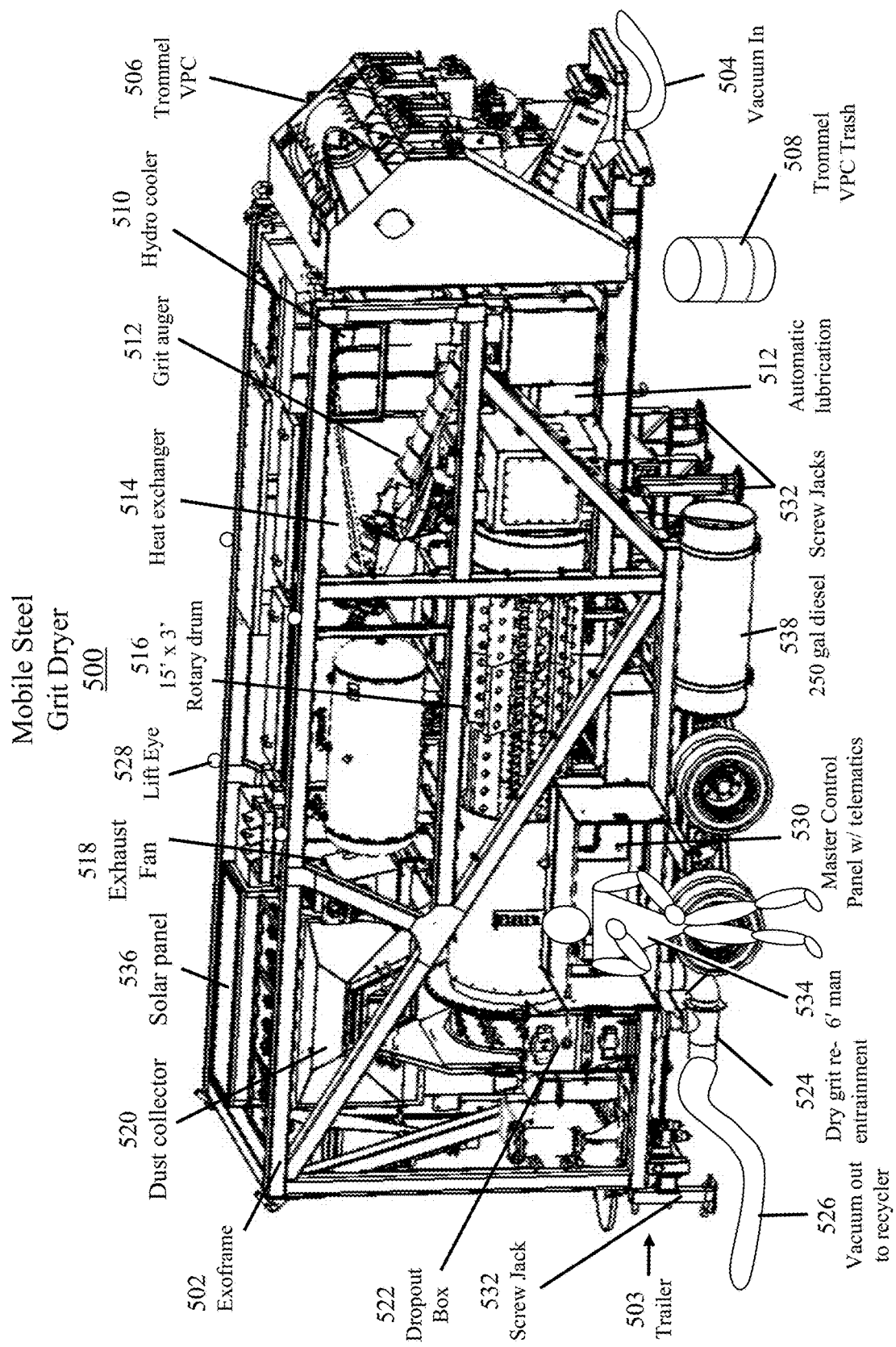

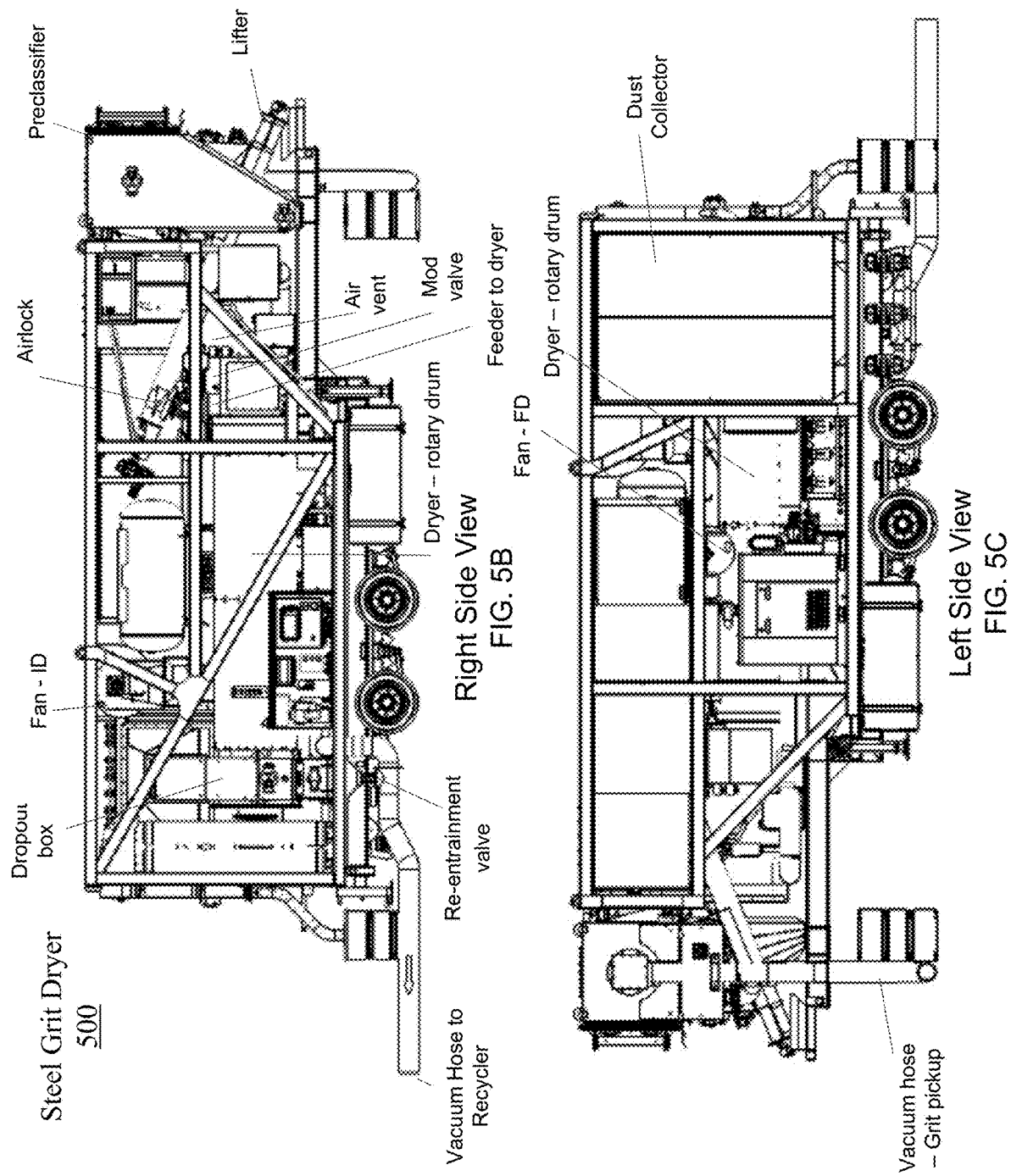

Front View

Rear View

Front Left Perspective View

Front Right Perspective View

Rear Right Perspective View

Rear Left Perspective View

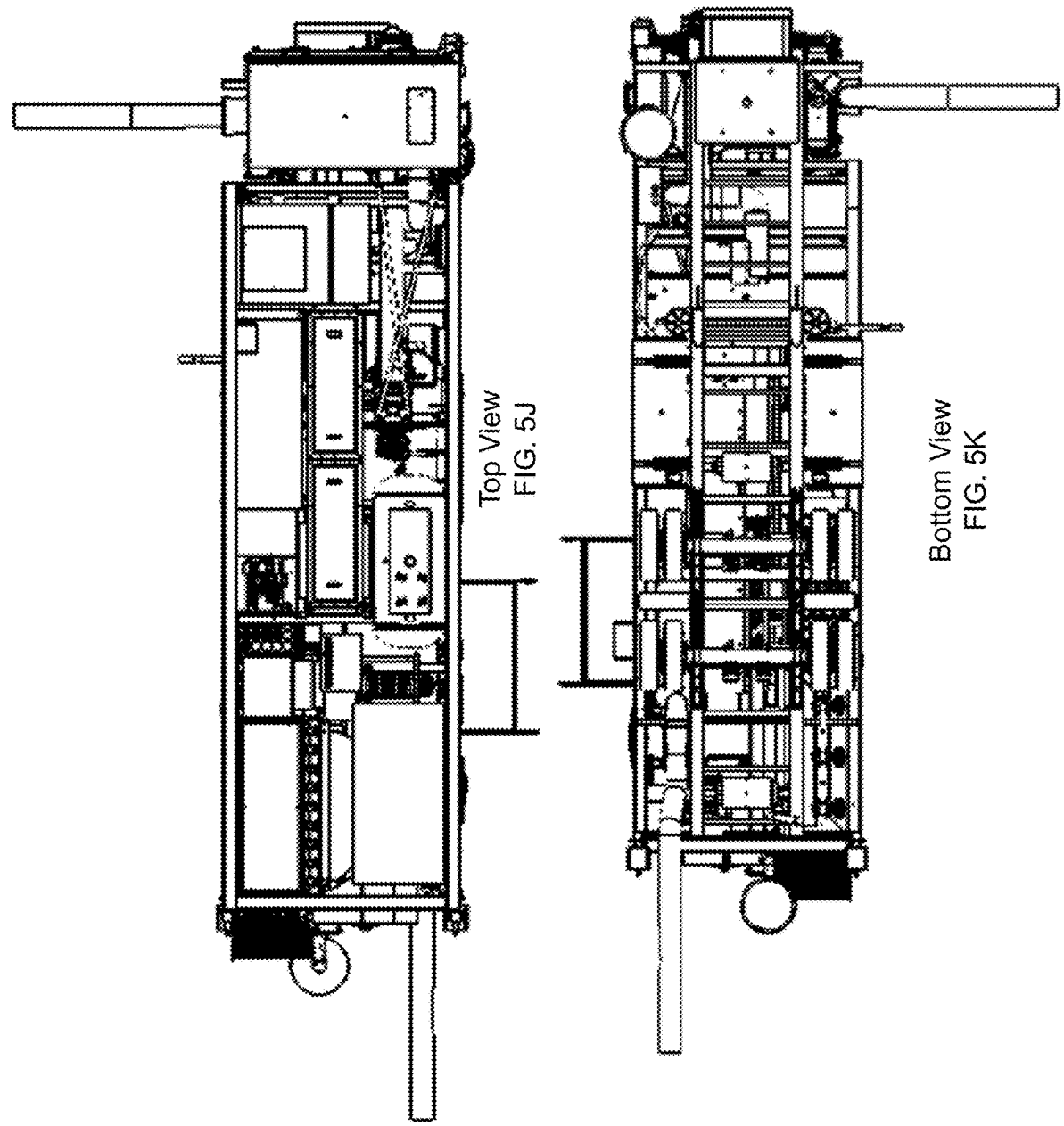

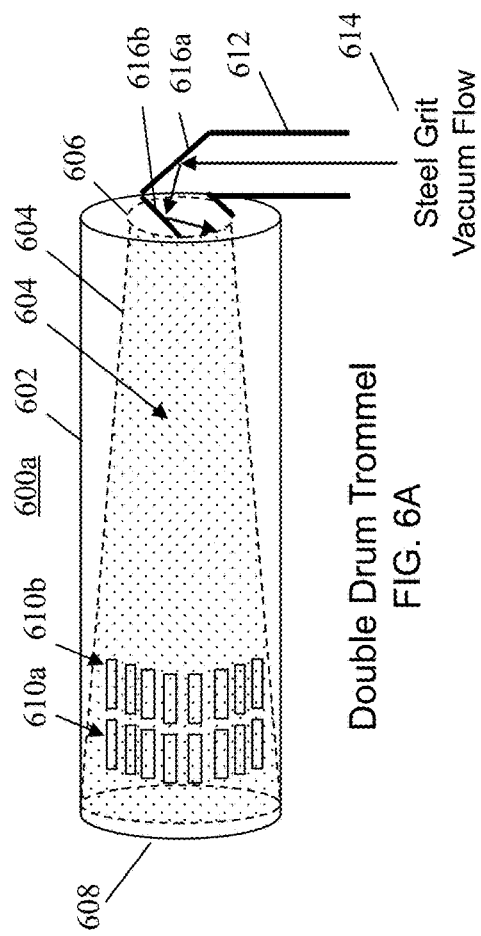
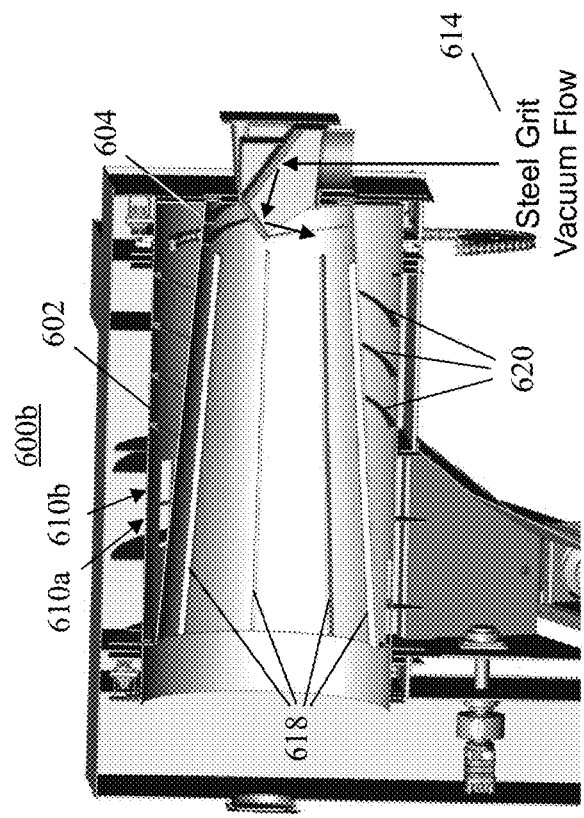
Double Drum Trommel
FIG. 6A
Double Drum Trommel
FIG. 6B

Load Cell w/ cam in travel position

Load Cell w/ cam operation position

Load Cell Lock System

Mobile Protection of
Load Cells w/ cam

Method of Operation of
Load Cell w/ cam

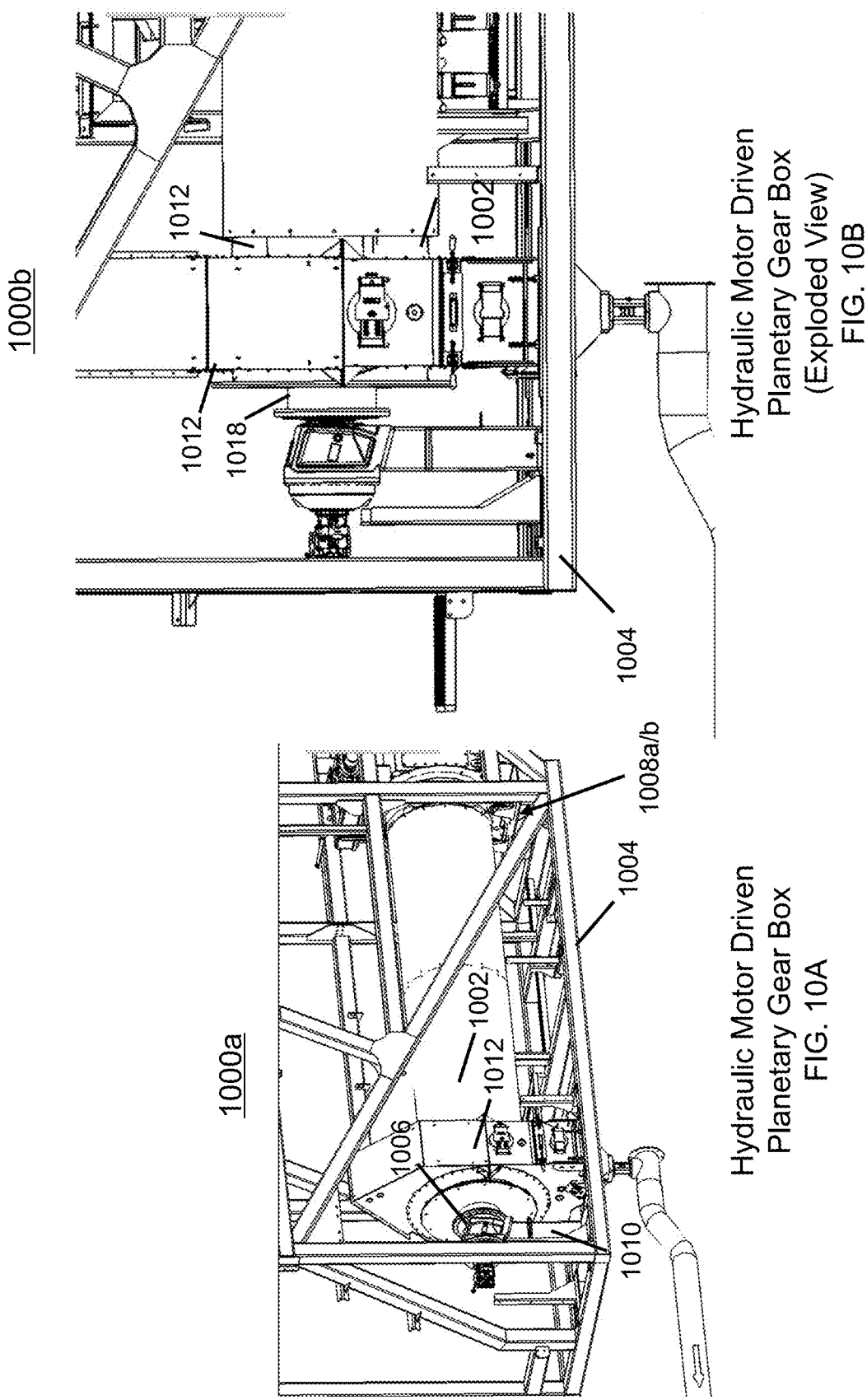

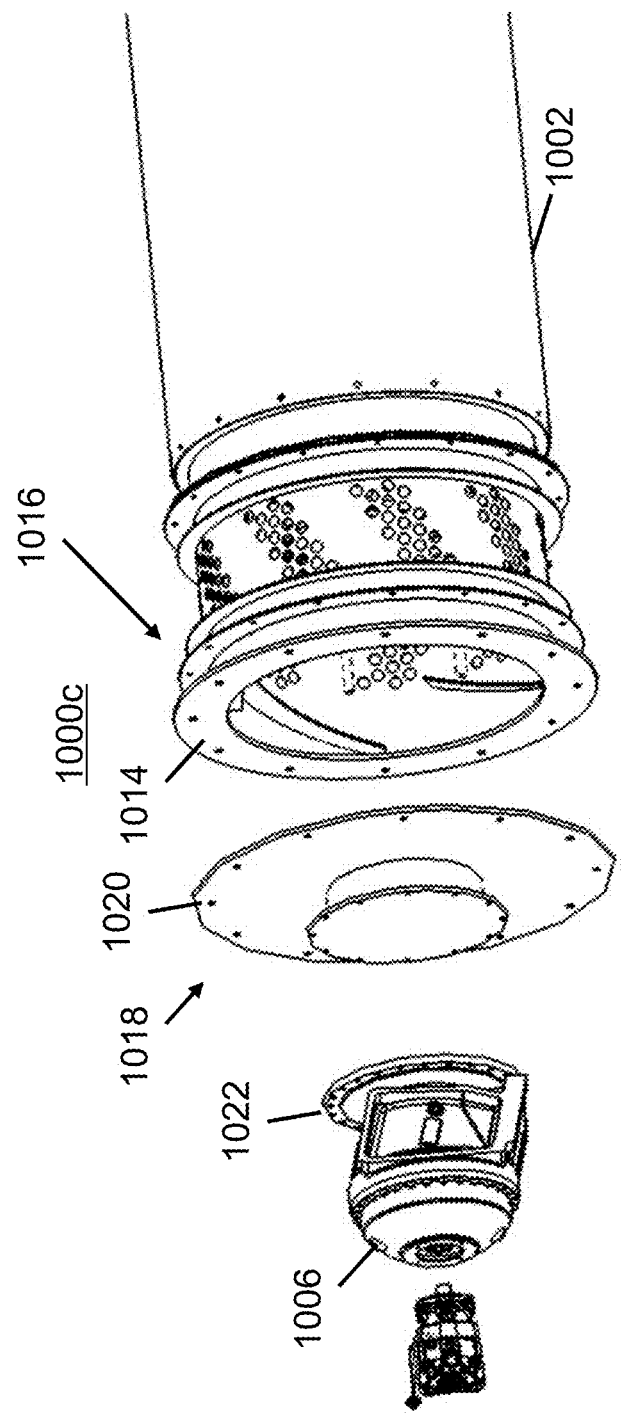

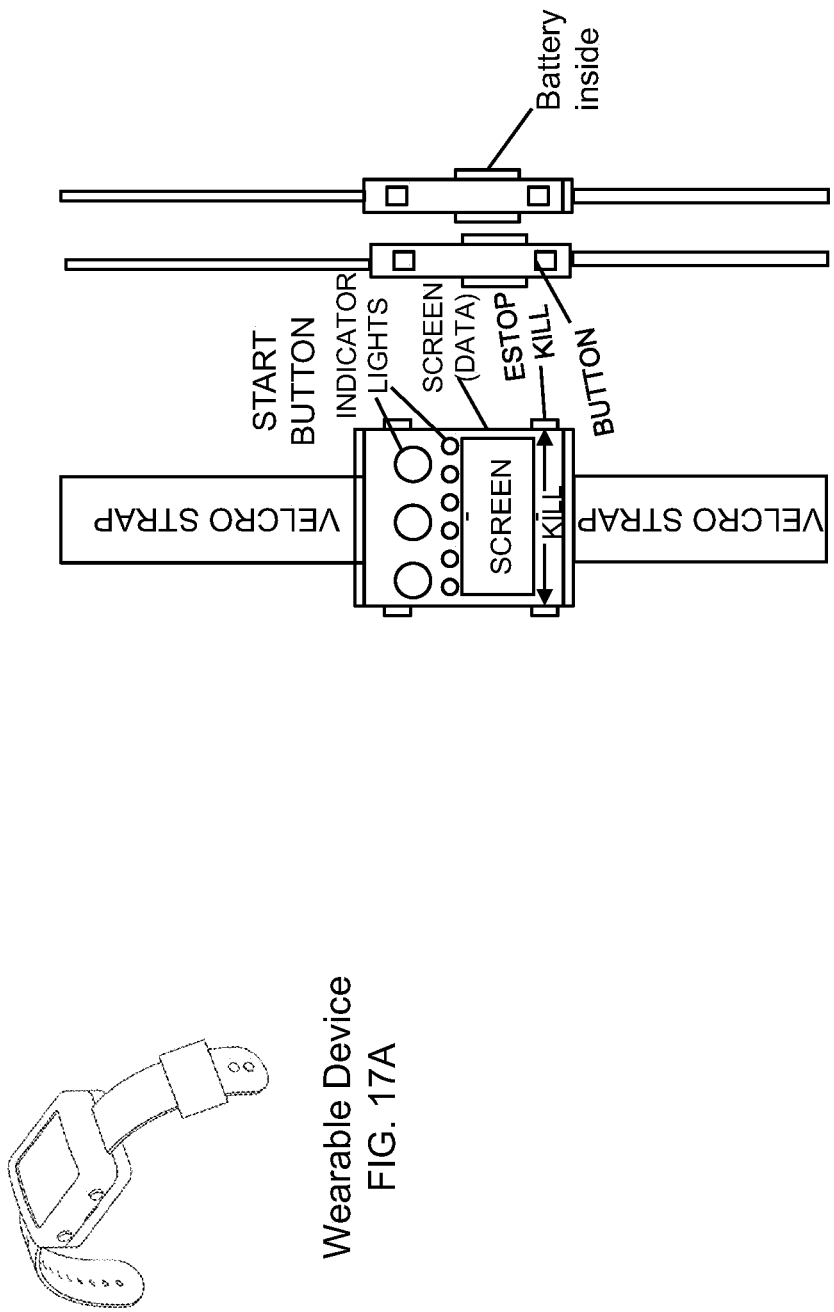

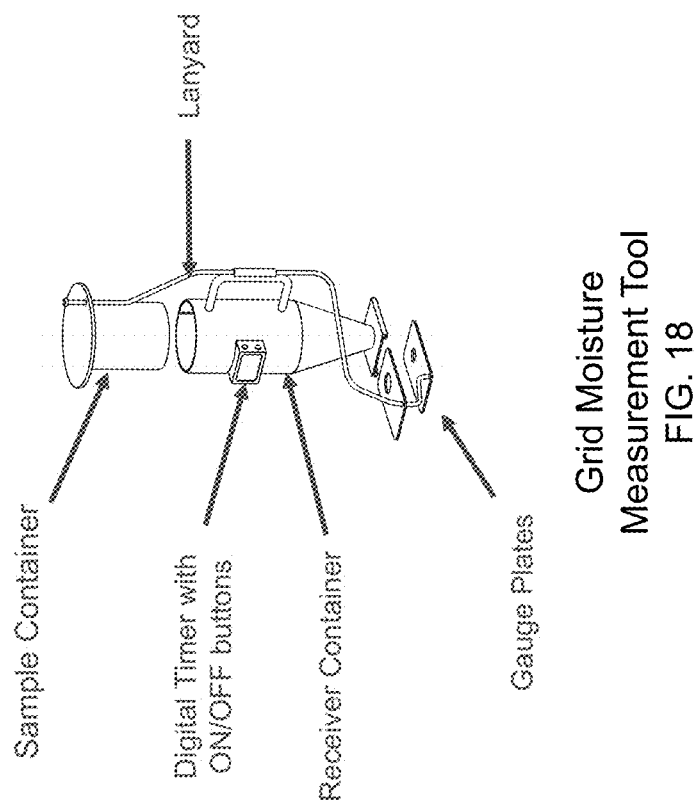

STEEL GRIT DRYER

RELATED APPLICATIONS

This Application is a Continuation Application of U.S. Patent Application having Ser. No. 16/705,189, filed on Dec. 5, 2019 (now U.S. Pat. No. 11,187,459), which claims priority from U.S. Provisional Patent Application 62/775,578, filed on Dec. 5, 2018; the contents of which are hereby incorporated herein by reference in their entirety.

BACKGROUND

The process of using grit, especially steel grit, as a blast media for cleaning steel goes back to the early 1900's, but it was not until the mid-1980's that steel grit began to be used in mobile applications. Some of the first places steel grit was used was for blast cleaning of steel tanks of all types and sizes, including nuclear torus vessels, water, and fuel tanks. When used inside a tank, moisture was typically not a problem, as the tank itself provided protection from rain and other precipitation.

The use of steel grit was so effective that contractors began using the steel grit to blast the exteriors of tanks and then bridges. However, the exposure to the environment made contamination from sudden rainstorms and other water sources a problem. Steel grit by its nature requires absolutely dry conditions (e.g., less than about 0.1%, less than about 0.05%, less than 0.001%, or lower), including the use of compressed air dried to a −10 degree dew point for abrasive blasting operations as condensate tends to cause corrosion of the steel grit particles.

When moisture comes in contact with steel grit particles, the moisture causes the particles, which are generally the size of a grain of sand, to stick together until exposure to air begins the process of corrosion, which leads to rusting of the steel grit. When rusting occurs, the small steel grit particles are bonded together by the corrosion process as the grit dries and rust forms. The corrosion process causes clumping in the steel grit as the steel grit particles literally rust themselves together, forming irregularly shaped "rocks" of thousands of corroded particles. These rocks and corroded steel grit result in a damaged steel grit that has to be thrown away or significantly reduces the effectiveness of the steel grit in blasting structures. Moreover, wet steel grit significantly negatively impacts steel grit recycling operations. For at least these reasons, operators typically avoid using steel grit in precipitation (e.g., rain or high humidity conditions), which is costly and inefficient.

The Economics of Using Steel Grit

In the process of abrasive blasting of bridges, tanks, ships and other steel objects, steel grit is becoming a popular media for a number of reasons. The primary reason is economics. The steel grit particles can be recycled up to 50 or more times with non-metallic particles being removed on each pass through the recycling machine. In addition to the recycling benefit, the density of steel grit is roughly 2.5 times greater than sand or coal slag, so the impact of the steel grit on a steel member or other structural surface is greater, meaning that more work is accomplished each time a steel grit particle hits the surface.

Abrasive blasting systems are used in preparing surfaces for painting. Some abrasive blasting systems are configured to recycle blast media after blasting the steel grit. The blast media capable of being recycled includes garnet, specular hematite, steel grit, steel shot, and other medias. The blast media is often cleaned at a certain stage in the recycling process to remove dust from the media, as the blast media is generally ineffective below a certain size (e.g., 15 mesh for steel grit), as understood in the art. Cleaning the blast media typically includes passing air across the blast media, so that as the blast media is collected in a hopper, the dust is already removed from the blast media, thereby making the blast media ready for use in blasting against a surface.

The steel grit abrasive blasting process is especially popular where hazardous paint coatings are to be removed, which creates a quantity of waste that is then disposed of as hazardous waste by law. By using steel grit, which gets recycled each time with all non-metallic hazardous material being removed through the recycling machine, the volume of waste can be reduced to roughly 1% of what would be created if non-recyclable medias like sand or coal slag are used. The recycling dramatically reduces the volume of waste that needs to be disposed of, thereby significantly reducing the cost of proper hazardous waste disposal. These economic benefits are what justifies the cost of steel grit recycling machines despite the drawbacks from precipitation, as previously described.

Because the cost of steel grit per ton is many times that of sand or slag, the steel grit may be recycled again and again to gain the economic benefits for the user, while at the same time reducing the volume of waste taken to disposal sites. Thus, when the grit falls to the containment surface or ground, the grit should be quickly recovered, usually using a vacuum device that pulls the grit back to the recycling machine.

Vacuuming or Gravity Recovery of Steel Grit

It is common today to use powerful vacuums driven by large diesel engines to recover the steel grit, whether the steel grit is collected on the ground, on a containment surface, or into some sort of collection hopper. In the recovery process, the steel grit can become mixed with flowing water from rain, which turns the mixture into damp or wet steel grit, thereby making it even heavier than the normal density of 265 lbs per cubic foot. The added moisture additionally causes the steel grit to become sticky, where the granular steel grit no longer flows as it would at an angle of repose of between approximately 30 and 40 degrees.

Because the steel grit is so valuable, costing up to $900/ton or more, the operator recovers the grit back to the recycling machine even though it is known that the free moisture will cause clogging and eventual clumping as the grit turns rusts. While vacuuming the steel grit for recycling, large water droplets are typically removed from the steel grit. However, enough moisture content on the grit itself remains to cause the rusting and clumping processes. In the process of vacuuming, any opening or wear of the vacuum hose can also allow water to enter the system, thereby causing further moisture problems.

If the wet grit is allowed to sit for a prolonged period of time (e.g., a few days), the grit can become so hard that it typically has to be removed using a jack hammer or other impact device. When sitting in a hopper, the water naturally drains to the bottom and can be drained off if a stainless steel filter screen at the bottom allows for drainage. However, moisture content residing on the surface of the steel grit that is not removed during the vacuuming process typically remains long enough to cause the rusting and clumping processes to occur.

SUMMARY

To help reduce or avoid rusting and clumping processes of steel grit to occur, a drying process of the steel grit may be performed. In one embodiment, the drying process may occur prior to recycling the steel grit through a blasting recycling system. The drying process may include a pre-classification process to remove rocks and other large debris from the steel grit at the steel grit blasting site. As described herein, the drying process may be performed separately from the recycling process in that the steel grit dryer may be a separate machine from the blast machine, but use a vacuum from the blast machine in transporting the steel grit to the grit dryer and then from the grit dryer to the blast machine. Both the grit dryer and blast machine may be mobile. Alternatively, one or both of the machines may be stationary (e.g., not positioned on a trailer with wheels, but rather being positioned on a skid or other base member).

The drying process may be performed in a variety of different ways. One technique may utilize a rotary drum that allows for the steel grit to be rotated and dropped using gravitational forces through heated air. The heated air may be drawn through the rotary drum using an exhaust fan that causes a slight negative pressure or pulled air within the rotary drum. The air may be heated in a variety of different ways, including using a flame that directly or indirectly heats air in the drum. Other non-flame techniques for heating the air may alternatively be utilized.

Humidity sensor(s) and/or temperature sensor(s) may be used in combination with a processing system to monitor moisture content on the grit indirectly by monitoring the moisture or temperature in the air, such as the heated air in the rotary drum, in which the grit is being recycled. Temperature sensors (e.g., infrared (IR) sensors) or other sensors may be utilized to indirectly determine moisture contained on the steel grit. The processing system may use sensor measurements to control speed of the rotary drum, angle of the rotary drum, time in which the grit is exposed to the heated air, temperature of the air, pressure of the air, speed of the heated air, and other parameters that affect the drying process. In addition, if the processing system determines that a moisture level or temperature of the air crosses a threshold level (i.e., either a high or low threshold level), then the processing system may alter the operation of a drying module that is performing the drying process. If, for example, the moisture level drops below a threshold level that is indicative that substantially no moisture exists, then the processing unit may redirect the grit to avoid the drying module and turn off the drying module to save power. For example, if the temperature of the air and/or steel grit is above a certain threshold, that, too, may be indicative of the moisture on the steel grit being below a certain percentage. If, for example, the moisture level increases, the processing unit may route the grit to the drying module and establish or alter parameter(s) to increase or decrease drying power of the grit dryer or drying module, which is an integrated, steel grit dryer onboard a steel grit recycling machine that may or may not include a steel grit blasting module. A notification to an operator in the form of an audible and/or visible signal may be generated when switching grit being routed to and from the grit dryer module.

BRIEF DESCRIPTION OF THE DRAWINGS

Illustrative embodiments of the present invention are described in detail below with reference to the attached drawing figures, which are incorporated by reference herein and wherein:

FIGS. 5A-5K are illustrations of an illustrative steel grit dryer that utilize the principles of operation;

FIGS. 6A and 6B are illustrations of an illustrative pre-classifier configured as a double drum trommel;

FIGS. 10A-10C are illustrations at different angles and zoom levels of a steel grit dryer, respectively, of a rotating drum in which steel grit may be dried is fixedly directly or indirectly secured to a structure, such an exoframe, at which the rotating drum is positioned;

FIGS. 17A and 17B are illustrations of an illustrative wearable device that an operator may use when operating the steel grit dryer to receive information and optionally control certain aspects of the steel grit dryer; and FIG. 18 is an illustration of an illustrative grit moisture measurement tool that may be used to measure moisture of the grit, such as steel grit, to aid an operator in determining when to use the steel grit dryer.

DETAILED DESCRIPTION OF THE DRAWINGS

Steel Grit Blasting and Recycling Processes

Figure 1:
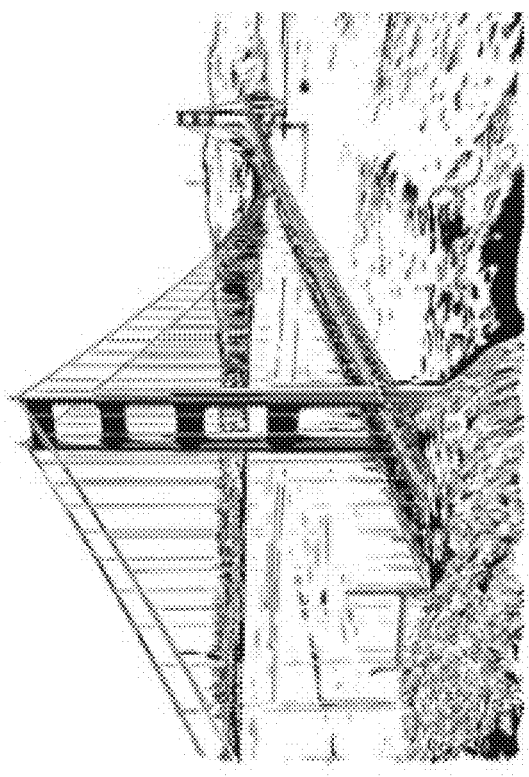
FIG. 1 is an illustration of an illustrative bridge on which steel grit is used to blast steel surfaces in preparation for painting.

The use of steel grit in preparing surfaces for repainting is the most effective and efficient way to clean a steel surface as a result of the steel grit being significantly heavier than other abrasives and having the ability to be recycled upwards of 100 to 200 times. Many other abrasives, such as sand and coal slag, are relatively light in weight as compared to steel grit and cannot be recycled, so those types of abrasives are the least effective and least efficient. In addition to the recycling benefit, the density of steel grit is roughly 2.5 times greater than sand or coal slag, so the impact of the steel grit on a steel structure is greater, meaning that more work is accomplished each time a particle hits the surface of the steel structure. A few abrasives, such as garnet grit, can be recycled, but limited to between five and eight times as a result of the garnet grit essentially wearing out and becoming too small to be an effective abrasive. Hence, steel grit is critically important to contractors who are in the business of repainting large steel structures, such as bridges and marine vessels. As a result of the steel grit having the ability to be recycled so many times, it is 99% or higher more efficient than other single-use abrasives and 95% more efficient than other abrasives that can be recycled a limited number of times. And, because of the weight of the steel grit, the efficiency for resurfacing steel structures may be as high as 20% or more for the contractors (e.g., 20% or more resurfacing can be accomplished in the same period of time as compared to the use of lighter abrasives).

Although steel grit is so much more effective and efficient, one problem that exists is that the steel grit clumps and corrodes when precipitation comes in contact with the steel grit, which causes the steel grit to become oxidized when further exposed to air. A steel grit dryer may be used to dry the steel grit so as to reduce or eliminate the oxidation process, thus reducing or preventing the steel grit from rusting. The steel grit dryer is meant to essentially evaporate moisture content from the steel grit as the steel grit is being recycled. Even in the case of using stainless steel grit, which is more expensive than conventional steel grit, not corroding due to moisture, the moisture causes the stainless steel grit to clump and stick together, thereby causing processing problems within steel grit recycling and/or blast machines.

As understood in the art, steel grit blast machines are used to blast the steel grit into the steel structures at high velocities. The steel grit may then be collected, typically by a vacuum process for larger projects, for reuse. If the steel grit contacts moisture, whether actual water or due to being within a high humidity environment, moisture content ends up on the surface of the steel grit. To collect and recycle the steel grit after blasting, a vacuum is often used by an operator. Larger recycling steel grit machines typically have onboard vacuums. Smaller blast-only machines generally do not have an onboard vacuum. In the case of a larger steel grit recycling machine, the vacuumed steel grit is initially pre-classified to remove large debris (e.g., shoes, dead birds, nails, gloves, rocks, sticks, etc.), classified (e.g., steel grit separated from other particulate matter, such as paint chips), and stored in a hopper or other container so that the steel grit is ready for blasting again. Conventional pre-classifiers are typically formed of plates defined defining screens to allow the steel grit to pass through and prevent larger debris from passing through and fall into a bin for later discarding. The debris and particulate matter may thereafter be transported to a hazardous waste removal location.

In particular, the steel grit abrasive blasting process is especially popular where hazardous paint coatings must be removed, which creates a quantity of waste that must then be disposed of as hazardous waste by law. By using steel grit, which gets recycled each time with all non-metallic hazardous material being removed through the recycling machine, the volume of waste can be reduced to roughly 1% of what would be created if non-recyclable medias, such as sand or coal slag, are used. The recycling of steel grit dramatically reduces the volume of waste that needs to be disposed because all other blast media is disposed of as hazardous waste, thereby significantly reducing the cost of proper hazardous waste disposal. These illustrative economic benefits, which may be millions of dollars annually depending on the size of the structure being resurfaced using steel grit, are what justifies the cost of steel grit recycling machines. Other economic benefits, such as reducing wages and overhead by being able to work more efficiently by using steel grit, further justify the use of steel grit as a blast media.

To avoid moist steel grit from slowing down the recycling process as typically occurs using existing recycling equipment that does not include the use of a steel grit dryer, a steel grit dryer may be used to dry the steel grit prior to recycling. Specific steel grit dryer configurations and processes may be utilized to ensure that the steel grit is efficiently collected, cleaned, dried, and delivered to a steel grit recycling and blast machine. And, depending on the environmental conditions (e.g., precipitation, humidity level, temperature, etc.), the steel grit dryer may have different modes of operation so as to minimize fuel consumption and maximize speed of processing. For example, if the environment in which the steel grit is being used is rainy, then the steel grit dryer may operate in a normal mode, such as at a temperature and speed that is capable of drying the steel grit. If, however, the environment has no rain, but the humidity is high, then the steel grit dryer may operate at the same temperature to dry the steel grit, but at a faster speed since the steel grit is not as wet so as to more efficiently dry and recycle the steel grit. If the environment has no rain and low humidity, the steel grit dryer may not heat the steel grit, but process the steel grit to aid in removing dust from the steel grit. Other configurations and/or modes are possible for processing the steel grit in the steel grit dryer, as described herein.

Steel Structures

With regard to FIG. 1, an illustration of an illustrative bridge 100 on which steel grit is used to blast steel surfaces in preparation for painting is shown. The bridge 100 is near a coastline and extends over water. Hence, the environment is often humid, which generally means that moisture content exists and steel grit that is used for resurfacing the steel of the bridge 100 becomes corroded and may have a more limited lifespan than what is possible for steel grit. Although containment systems are used to try and prevent rain and other precipitation from impacting the work areas for the resurfacing and repainting operations, it is not possible to keep all water away from steel grit that is blasted by a steel grit recycling machine that includes a blasting function on the surfaces of the bridge 100 that falls to the ground or scaffolding platforms as containment systems leak and water inevitably enters into the containment area. With a steel grit dryer, moisture content may be removed from the steel grit during recycling such that the steel grit is protected from corrosion and flows better within the recycling machine and use of the steel grit is generally more consistent.

Figure 2:
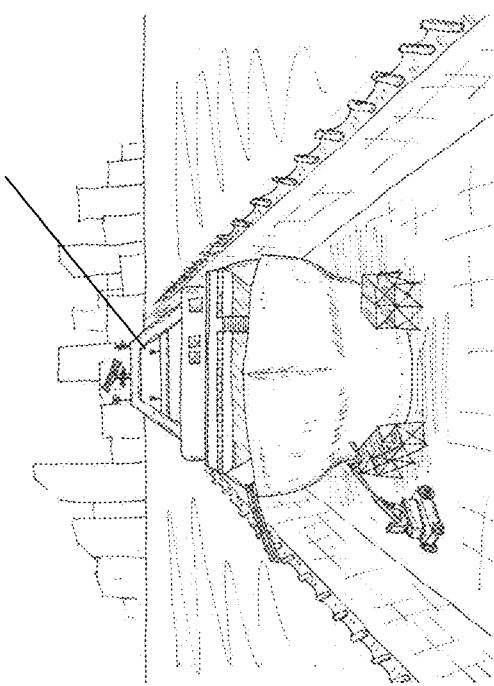
FIG. 2 is an illustration of an illustrative dry dock including a marine vessel that is being maintained, including being resurfaced and repainted so as to limit environmental damage (e.g., corrosion from salt water) to the steel hull.

With regard to FIG. 2, an illustration of an illustrative dry dock 200 including a marine vessel 202 that is being maintained, including being resurfaced and repainted so as to limit environmental damage, such as the steel hull being corroded by salt water, is shown. Because dry docks are in marine environments, salt water or rain water is often present. High humidity also plagues the dry docks due to being on a coastline such that operators that resurface and repaint the surfaces of the marine vessel often avoid the use of steel grit because the cost of the steel grit can be excessive with the losses due to moisture. Other structures, such as fluid tanks, offshore drilling rigs, buildings, dams, and so on, often have the same problems depending on the locations and/or seasons. Hence, to improve the efficiency and reduce cost for contractors to resurface steel structures, such as bridges and marine vessels, a steel grit dryer with certain features and functions may be used to aid in the recycling process of the steel grit.

Inline Steel Grit Dryer with Heat Process Bypass Vacuum Path

In the process of drying grit particles in a steel grit dyer, whether portable or stationary, where dry, damp or wet grit is being recovered, the grit dryer separates internal processing components under a high vacuum from internal processing components not under vacuum. The configuration of the steel grit dryer may be configured to be pneumatically positioned in line with (i) a vacuum hose used by an operator to vacuum in steel grit and (ii) a vacuum typically positioned on a steel grit recycling machine. As will be shown in FIG. 4A, a primary dryer component that is not under vacuum is a dryer, which may include a rotary drum dryer. A separate airflow with heated air is run through the dryer from end-to-end and used to dry the granular steel grit that has been moved to and loaded into the dryer for thermal processing (e.g., rotary thermal processing).

To apply the vacuum pressure airflow, a number of scenarios are possible with regard to configuring an inline grit dryer, including, but not limited to:
(a) a portable (trailer or skid) or stationary grit recycling machine with onboard self-contained vacuum is combined with an onboard, self-contained rotary grit dryer;
(b) a portable (trailer or skid) or stationary grit recycling machine without onboard self-contained vacuum is combined with an onboard self-contained rotary grit dryer, where vacuum is supplied by a separate freestanding vacuum system;
(c) a portable (trailer or skid) or stationary grit recycling machine with onboard self-contained vacuum is combined with a freestanding rotary grit dryer (see, for example, FIG. 3)
(d) a portable (trailer or skid) or stationary grit recycling machine without onboard self-contained vacuum is combined with a freestanding rotary grit dryer.

In each case, and as a restatement, recovery of dry, damp, or wet steel grit is made possible by placing the portable or stationary grit dryer "inline" on the vacuum recovery hose path between where grit is picked up (i.e., on the ground or platform beneath a structure at which the steel grit has been blasted) to where the steel grit is vacuumed to, typically a steel grit recycling machine for large structures or a storage hopper for either large or small structures.

Figure 3:
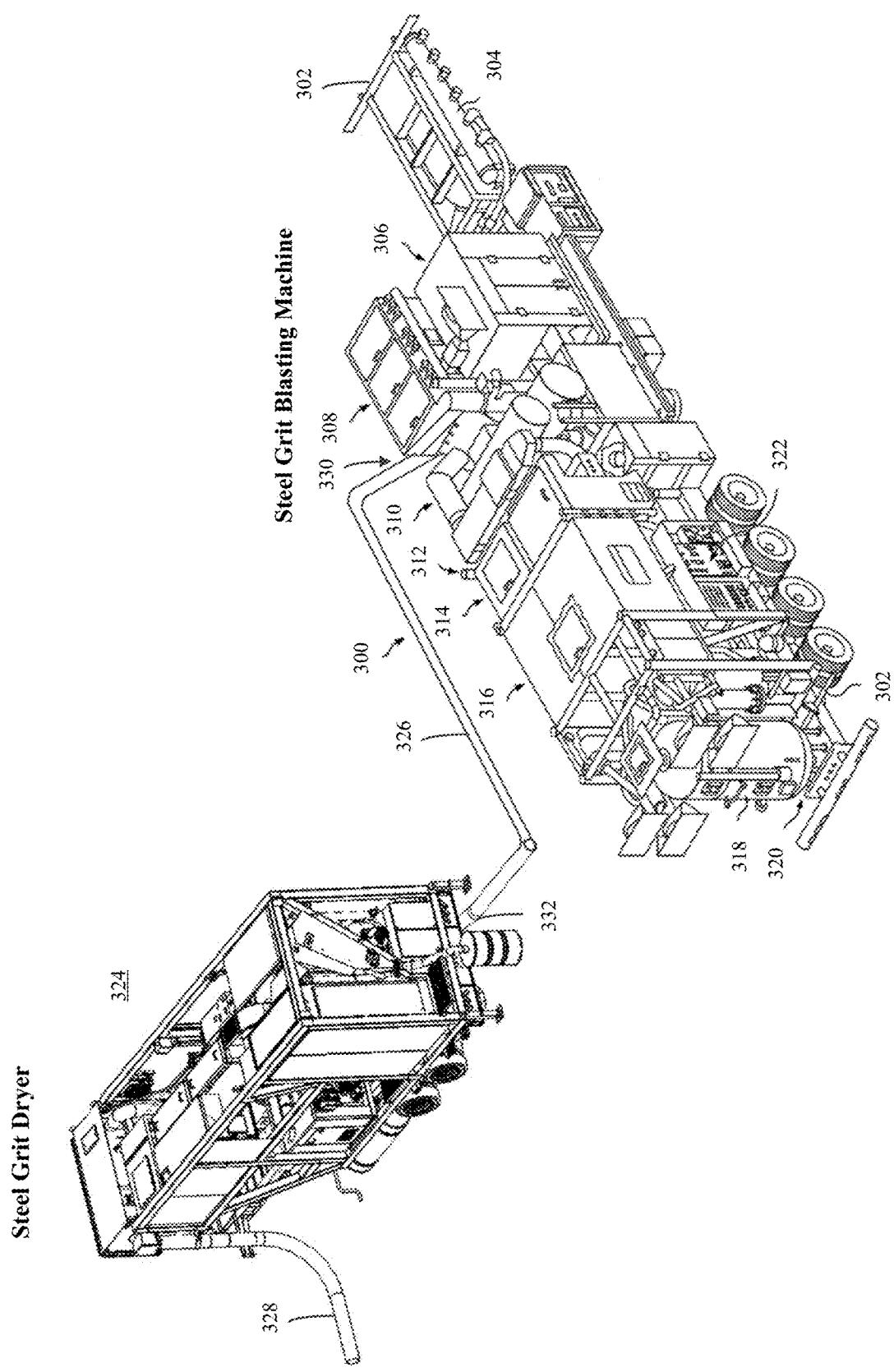
FIG. 3 is an illustration of an illustrative abrasive blasting machine in accordance with the principles provided herein.

To accomplish the inline grit dryer configuration, a vacuum path, which is typically formed by a hose, is broken or separated by inserting the grit drying process in the middle of the grit flow from pickup (i.e., vacuum hose handled by an operator) to the grit recycling machine, as further provided at least in FIGS. 3 and 4.

Steel Grit Recycling Machine and Steel Grit Dryer

With regard to FIG. 3, an illustration of an illustrative abrasive blasting machine 300 in accordance with the principles provided herein is shown. The abrasive blasting machine 300 in this configuration is mobile in that the machine 300 resides on a trailer 302 that enables the abrasive blasting machine 300 to be transported from job site to job site for performing abrasive blasting on a structure (e.g., bridge) at the job site.

The abrasive blasting machine 300 is a series of complex systems that are configured in a deliberate way to perform certain functions in a certain order. From front to rear, the abrasive blasting machine 300 includes a compressor manifold 304 that enables multiple compressors to feed into the manifold 304 for use in blowing blast media by the abrasive blasting machine 300. An engine 306, which may be a diesel engine or other powered engine, for use in producing vacuum power and generating hydraulic power for driving various components on the abrasive blasting machine 300. A vacuum 308 may be utilized to enable an operator of the abrasive blasting machine 300 to vacuum blast media after the blast media is projected onto surfaces of a structure being prepared for a protective coating to be applied thereto. The abrasive blasting machine 300 includes a number of modules, including a pre-classifier 310 may be utilized to sort out debris or other material that is collected by the vacuum and greater than a certain size, such as three-sixteenths of an inch, and an air wash 312 that is used to cleanse dust that is collected by the vacuum 308. A classifier module 314, which separates steel grit from smaller debris, such as paint chips, sand, and dust, by using a magnetic drum, for example, that are collected by the vacuum process.

A storage hopper 316 may be utilized to store blast media that is utilized for performing the abrasive blasting by the abrasive blasting machine 300. One or more pressure vessels 318 may be utilized to generate a pressure for the blast media in being introduced into airflow created by a compressor. The pressure vessel(s) 318 may be in fluid communication with metering valves 320 that are selectively open and shut for introducing the blast media into airflow produced by the compressor for use in blowing the blast media onto surfaces of a structure being prepared for a protective coating to be applied thereto.

In operation, airflow without blast media may be created and used by an operator of a blast hose (not shown) that includes a nozzle (not shown). Blast media may be selectively added to the airflow and directed onto surfaces of a structure. As understood in the art, the nozzle of a blast hose may include a "dead-man" switch (not shown) that, when in a first position, causes compressed airflow to be pushed through the blast hose and nozzle, and, when in a second position, causes both airflow and blast media to be pushed through the blast hose and nozzle. The dead-man switch may be in communication with a controller 322 and/or other valve control circuitry (not shown) that causes the airflow and/or blast media to be blown through the blast hose and nozzle. Alternative control switches may be utilized to control operation of the steel grit abrasive blasting machine 300.

The controller 322 may be part of the abrasive blasting machine 300 and used to control components of the abrasive blasting machine 300. The controller 322 may further be configured to collect and process sensor data from sensors that are applied to sense operation of various components of the abrasive blasting machine 300. The controller 122, which is fundamentally a processing unit that performs control and data collection functionality, may be composed of one or more computer processors and other circuitry. The controller 322 may be utilized in a manner that generates "intelligence" for other machines, such as a steel grit dryer, owners/operators of the machine 300, and customers of the abrasive blasting machine 300. In an embodiment, the controller 322 may be configured to control and/or communicate commands and data with an onboard grit dryer module or standalone steel grit dryer for use in drying the steel grit.

To remove moisture content from the steel grit, or any grit material for that matter, a steel grit dryer machine 324 ("steel grit dryer" or "dryer") may be set inline with a vacuum path extending in fluid communication with the vacuum 308 of the abrasive blasting machine 300 or an external, standalone vacuum (not shown). The vacuum path may include a first vacuum hose 326 extending between the abrasive blasting machine 300, heat bypass vacuum path in the dryer 324, and second vacuum hose 328 extending from the steel grit dryer 324 for use by an operator to vacuum steel grit that has been used to blast a structure. The first vacuum hose 326 may connect between a first connector 330 on the blasting machine 300 and a second connector 332 on the dryer 324. The heat process vacuum bypass path in the dryer 324 allows for the steel grit that is vacuumed into the steel grit dryer 324 and processed thereby without pulling heat from the dryer 324 into the steel grit blasting machine 300.

As described further herein, the steel grit is (i) removed from the vacuum pressure airflow path in the dryer 324, (ii) pre-classified under vacuum pressure, (iii) transitioned from the vacuum pressure to ambient pressure, (iv) dried by being exposed to heated air, and (v) re-entrained back into the vacuum pressure airflow path so that the dried steel grit can be flowed into the blasting machine 300. The heat process vacuum bypass path is isolated from heated air produced by a heat source, and may be used to pneumatically transport the dried steel grit between the steel grit dryer 324 and the steel grit blasting machine 300. The heat process bypass configuration of the vacuum path allows for contractors to use an existing vacuum already available on the abrasive blasting machine 300, thereby saving space and/or cost for the contractor from having to operate a separate vacuum. The heat process bypass configuration further saves a manufacturer of the dryer 324 from having to integrate a vacuum on the dryer 324, thereby saving cost from having to add a vacuum and space on the dryer 324.

Steel Grit and Airflow Paths

Figure 4A:
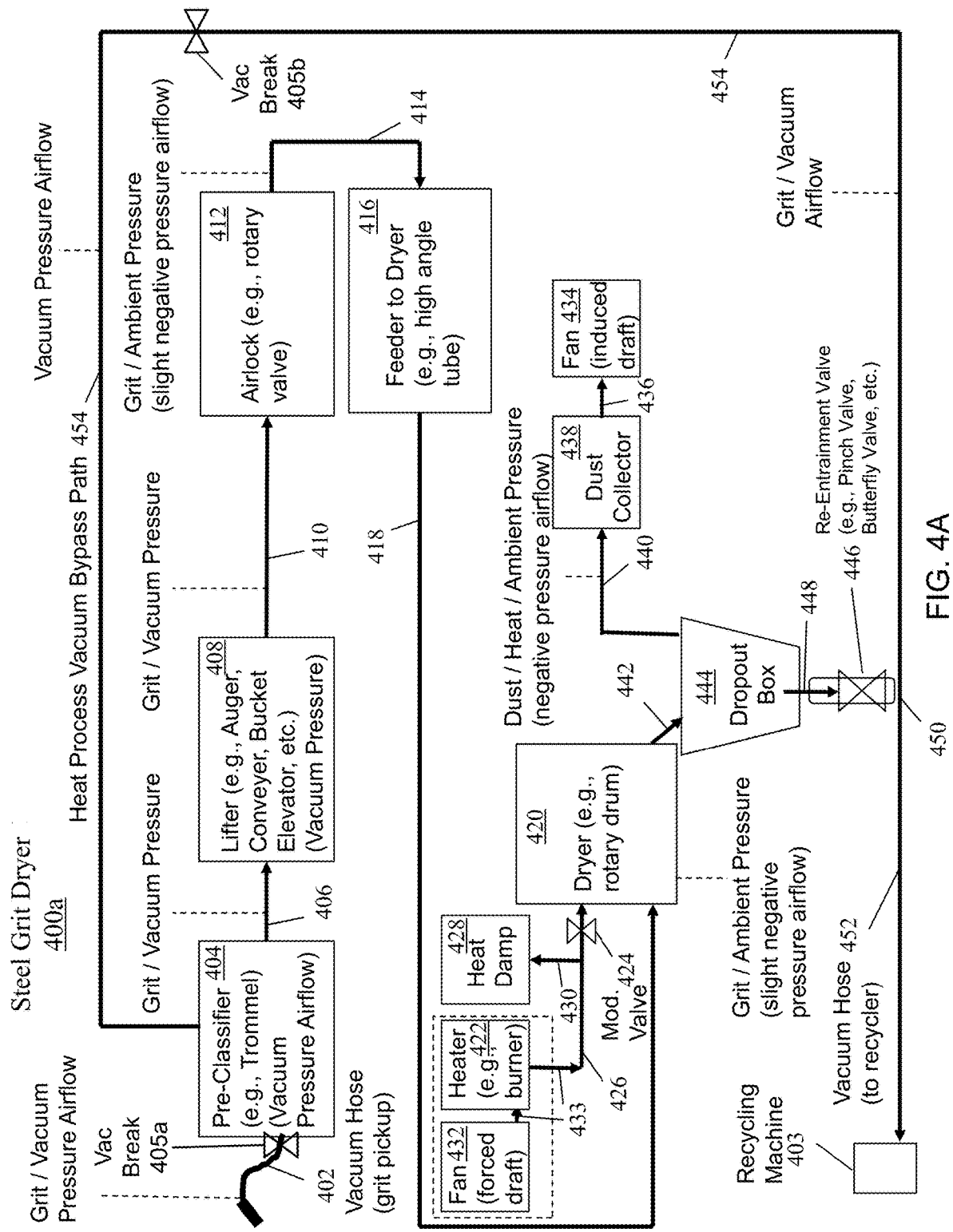
FIGS. 4A and 4B (collectively FIG. 4) are block diagrams of illustrative steel grit dryer components and (a) steel grit and airflow paths and (b) electrical components of an inline steel grit dryer with respect to a vacuum hose and a steel grit recycling machine, for example, to which dried steel grit is conveyed from the steel grit dryer.
Figure 4B:
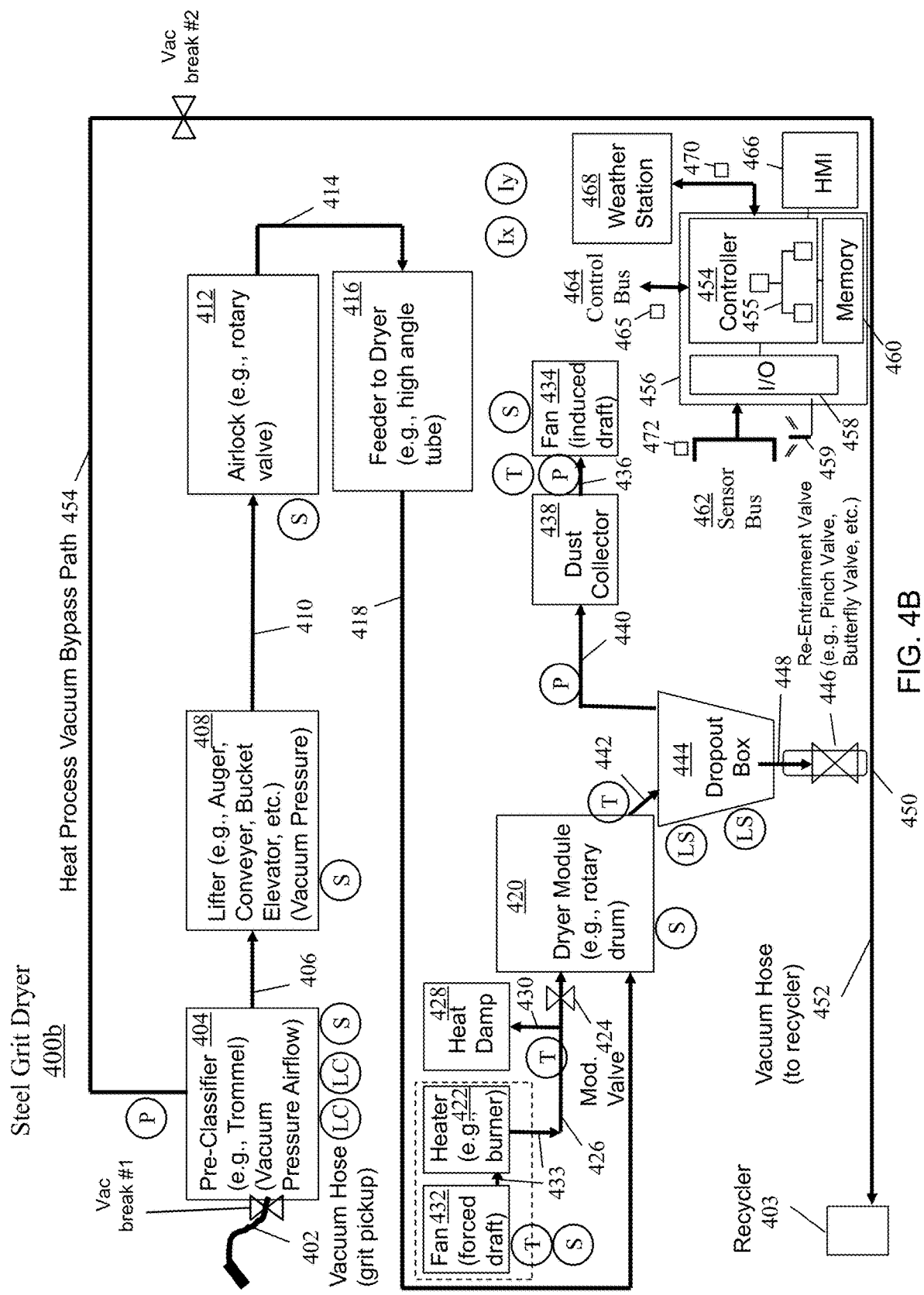
Figure 5E:
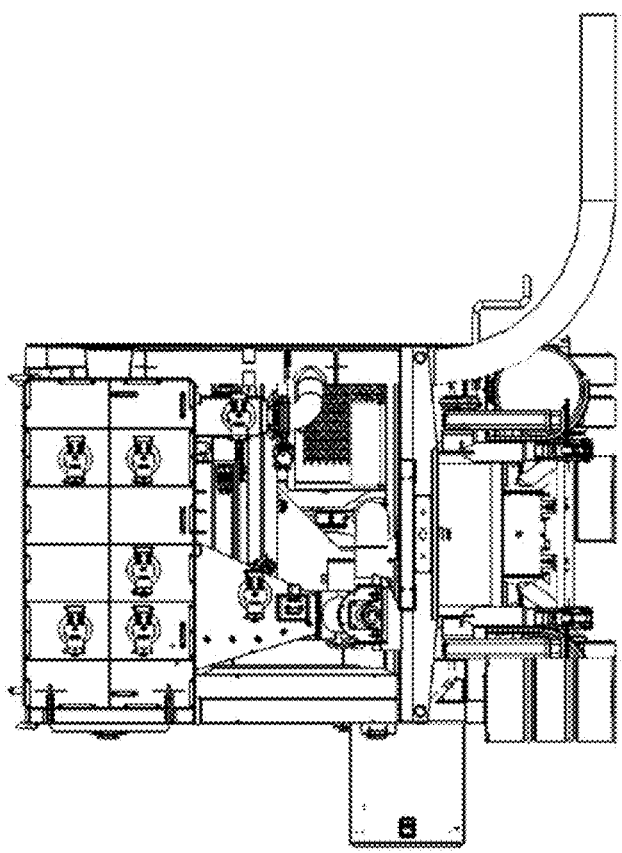
Figure 5D:
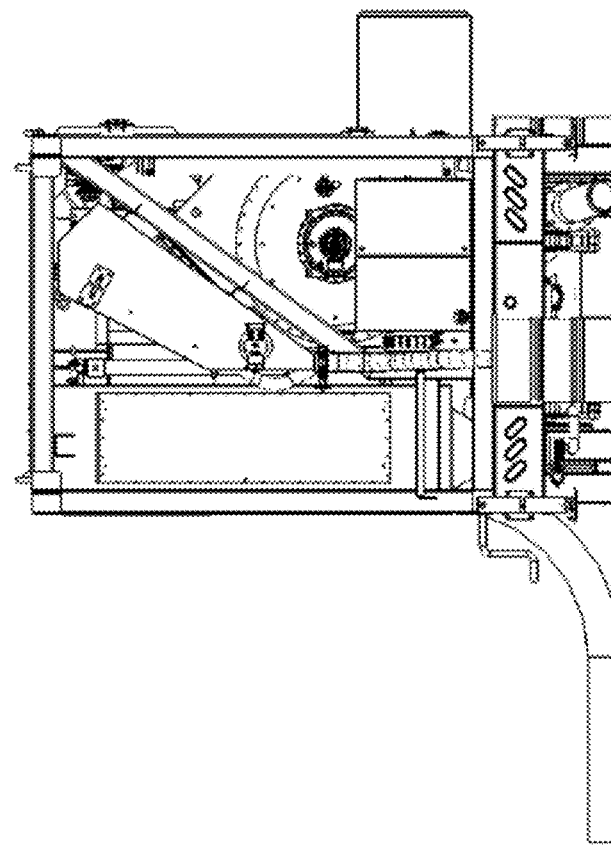
Figure 5G:
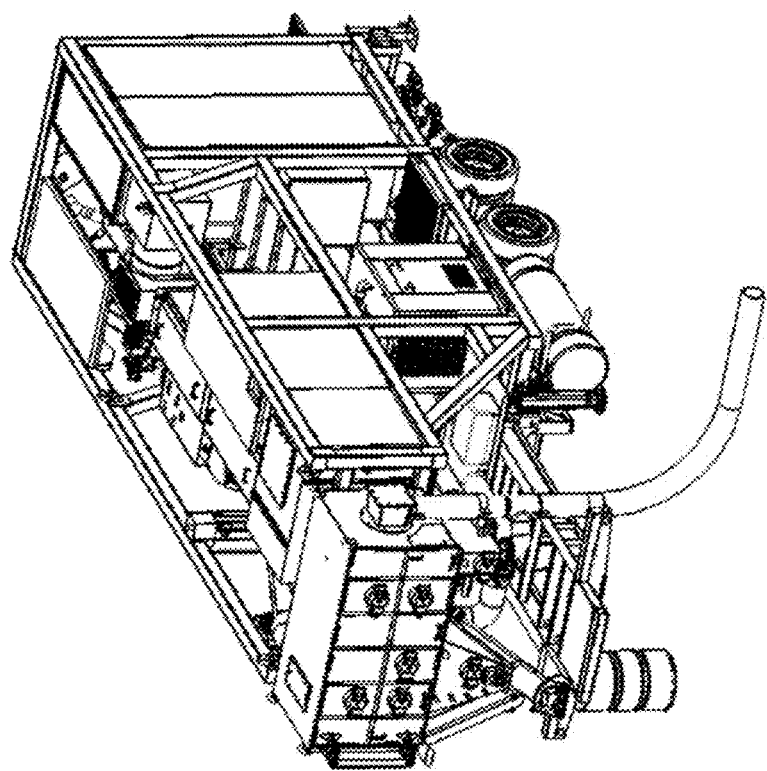
Figure 5F:
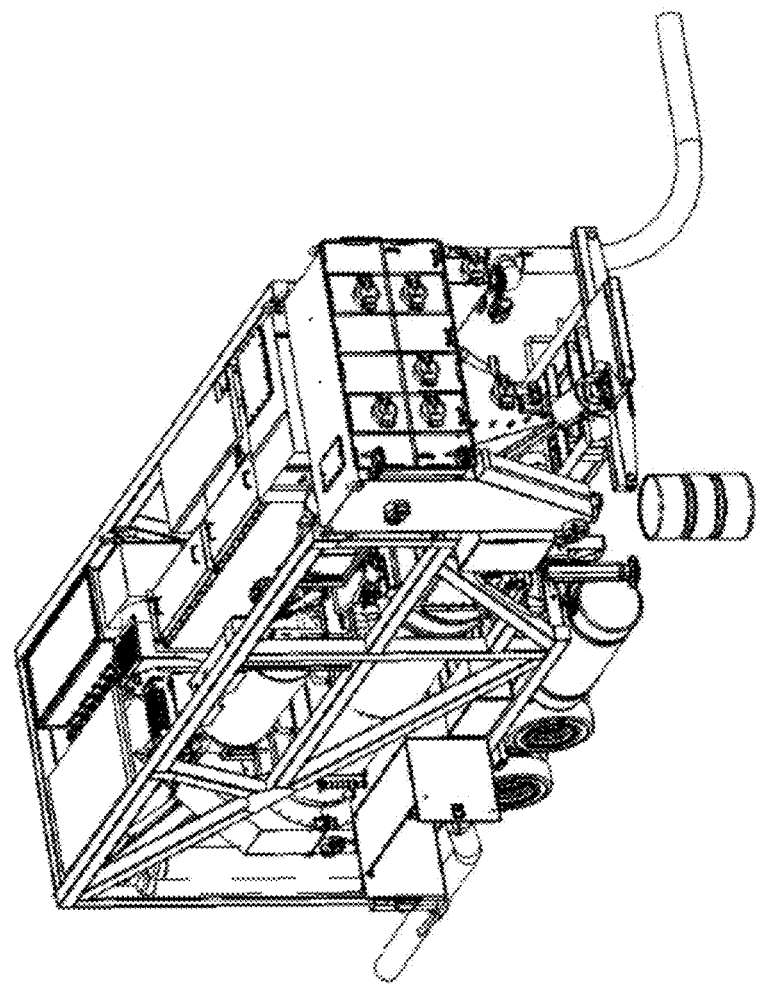
Figure 5I:
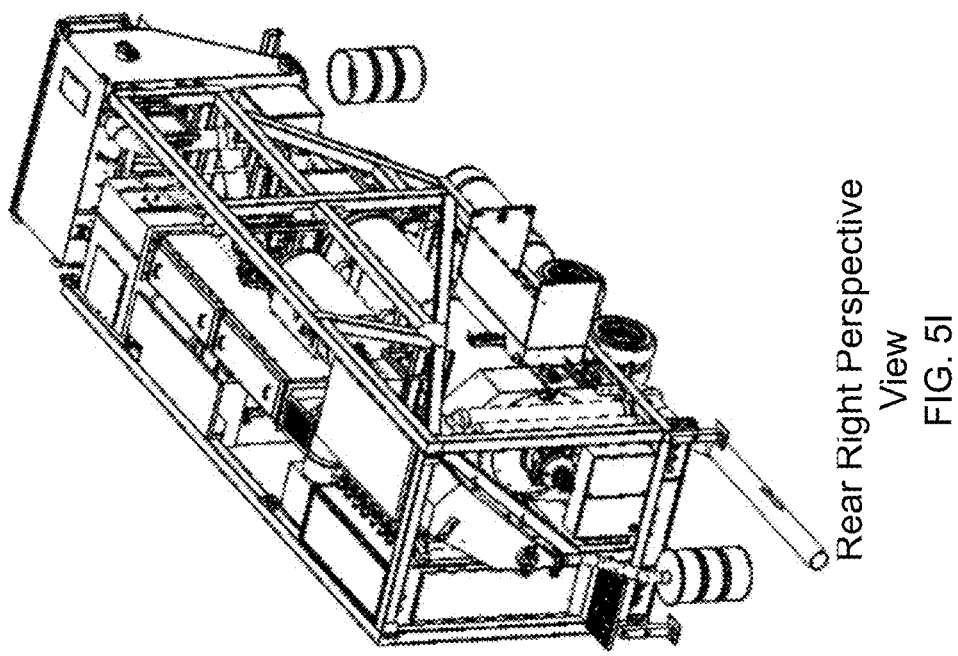
Figure 5H:
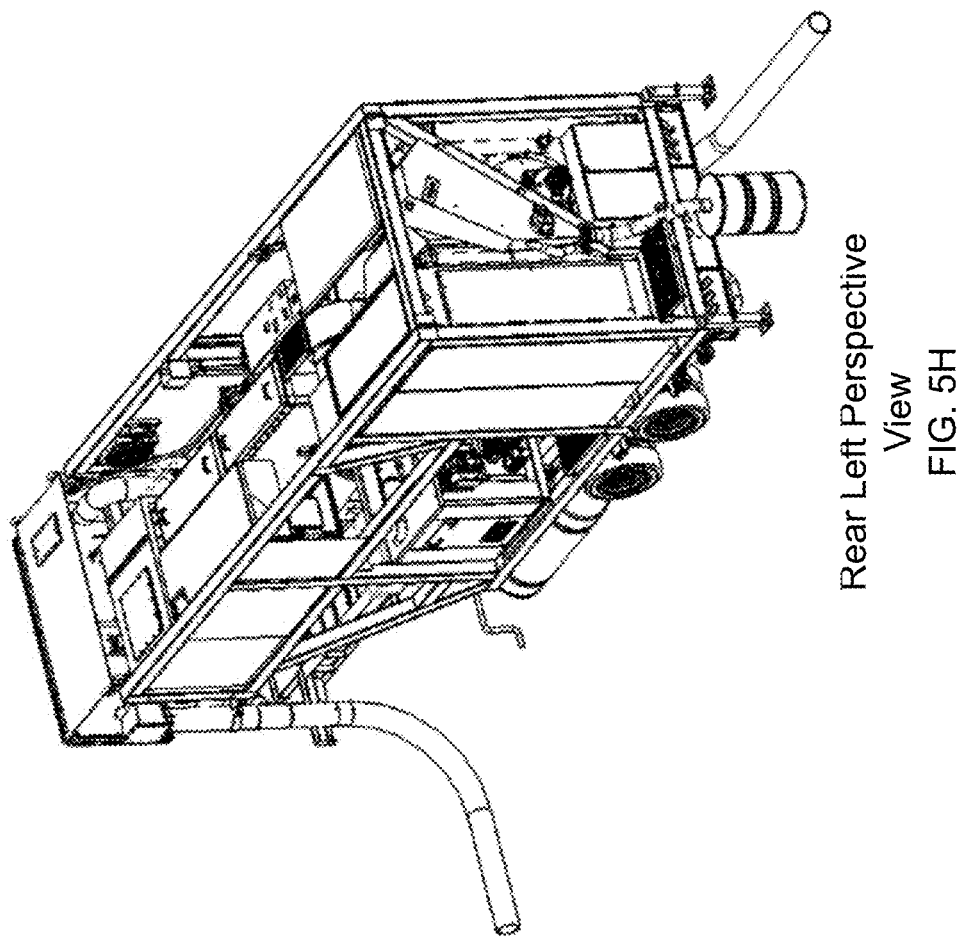

With regard to FIGS. 4A and 4B, block diagrams of illustrative steel grit dryer components and (a) steel grit and airflow paths and (b) electrical components of an inline steel grit dryer 400a and 400b (collectively 400) with respect to a vacuum hose 402 and a steel grit recycling machine 403, for example, to which dried steel grit is conveyed from the steel grit dryer is shown.

The steel grit dryer 400 includes a pre-classifier 404 with which the vacuum hose 402 that is used by an operator to vacuum up steel grit is in fluid communication. The pre-classifier 404 may include a rotating or rotary trommel, vibrating screen, or any other type of pre-classifier that is configured to remove large objects, such as dead birds, shoes, or other debris, that are vacuumed into the steel grit dryer 400 via the vacuum hose 402. The steel grit dryer 400a may include a first vacuum break 405a that may be used to stop vacuum pressure airflow from passing through the vacuum hose 402 beyond the vacuum break 405a, and a second vacuum break 405b that may be used to stop vacuum pressure airflow from being pulled from the pre-classifier 404. The use of the vacuum break 405a may be used in the event of an emergency or clog at the vacuum hose inlet, such as an operator or debris being pulled into the vacuum hose. In accordance with the principles provided herein, the rotary trommel may be a double-drum trommel, including a conical-shaped drum that rotates within a tubular-shaped drum, as further shown and described in FIGS. 6A and 6B.

More particularly, the pre-classifier 404, if configured as a rotary trommel, may be configured to perform several processes. A primary process is to filter the incoming steel grit that is being recycled by removing oversized material (e.g., larger than perforations defined by a first rotating drum) in to a discharge end opposite the end in which the steel grit enters the pre-classifier 404, as further provided hereinbelow. Another function is to allow both dry and/or wet and damp grit materials to pass through the perforations defined by the sidewall of the first rotating drum optionally a second rotating drum and to fall via conduit 406 that extends from the pre-classifier 404 to a lifter 408. The conduit 406 allows steel grit to pass from the pre-classifier 404 to the lifter 408 for continuing the grit processing using gravity as a primary conveyer in the ambient air pressure thereafter.

With regard to the oversized material being discharged by the pre-classifier 404, although not shown, the oversized material may fall into a chute that remains under vacuum pressure during operation of the vacuum. The dryer may be configured with an air lock in the chute to enable the debris to be released during operation of the dryer 400. In another embodiment, and because the amount of oversized debris is typically limited, the chute may be configured with an air-tight door and the operator may open the door when the steel grit dryer is not in operation or when the vacuum is turned off. Alternative configurations are possible to enable an operator to remove the oversized debris to be removed from the dryer 400.

The lifter 408 may include any mechanism that enables the steel grit to be lifted after being pre-classified. The lifter 408 may include an auger, conveyor, bucket elevator, pneumatics, hydraulics, and/or any other mechanical, electromechanical, pneumatic, or other mechanism, for example, to hoist the steel grit for further processing. In an embodiment, an auger that includes a screw with flights for conveying the steel grit at an angle, such as a 60° angle, may be utilized.

From the lifter 408, the steel grit to a higher elevation may be passed in a conduit 410 into an airlock 412. The airlock 412 may include a rotary valve or any other airlock, such as a duel butterfly valve. The airlock 412 allows for the steel grit to pass from a vacuum air pressure into an ambient air pressure for further processing therein. It is noted that in the event that the rotary airlock 412 positioned below the lifter 408 ever gets plugged, the availability of a manually opened and locked emergency discharge door at the top of the lifter 408 (e.g., rotary auger), positioned just below the opening to the rotary airlock 412, is available to provide a way of cleaning out the lifter 408 in the event that the lifter 408 get plugged. In an embodiment, however, the system may be configured to limit grit from filling the rotary airlock 412 (e.g., 50% full), thereby protecting the integrity of the rotary airlock 412, as further provided herein.

A conduit 414 may be in fluid communication with the airlock 412, and be arranged to guide the steel grit into a feeder 416 for delivery into a dryer 420 in which the steel grit is to be dried. The feeder 416 may be a tube or any other conduit or manifold. In an embodiment, the feeder 416 may be a chute or dropout box having a high angle so that the steel grit, which is likely still moist when being vacuumed in wet conditions, does not stick to sidewalls of the feeder, but rather slides therethrough.

A conduit 418 may extend from the feeder 416 into a dryer 420. The conduit 418, which may be open (e.g., slide) or closed (e.g., pipe), may be part of the feeder 416 or may be a connection member, such as a pipe, that directs the steel grit that passes through the feeder 416 into the dryer 420. In an embodiment, the dryer 420 may include a rotary drum (see FIGS. 5A-5K). Alternatively, the dryer may include a screen, such as a moving screen, on which the steel grit may be conveyed from a first end to a second end while being dried in heated air through which the screen passes.

To heat the air, a heater 422 may be utilized. In an embodiment, the heater 422 includes a burner that produces a flame that directly or indirectly heats air in which the steel grit is to be dried within the dryer 420. Alternatively stated, because the steel grit does not absorb moisture, water is evaporated by the heat within the dryer 420. In an embodiment, the heater 422 includes a heat exchanger that includes a box within which a flame or other heating element may produce heat, and walls of the box may radiate the heat therefrom. The use of a heat exchanger prevents "dirty air" (e.g., carbon emissions) produced by the fuel that creates the flame to contact the steel grit being dried.

Modulating Valve

To control temperature of the heated air within the dryer 420, a modulating or temperature control valve 424 may be utilized to remove excess heat within a conduit 426 that conveys heated air produced by the heater 422 into the dryer 420. The modulating valve 424 may further be in fluid communication with an heat exhaust 428 via a conduit 430. In an embodiment, if the temperature of the heated air in the dryer 420 is directly (e.g., measured at the end of the rotating drum) or indirectly (e.g., measured in the conduit 426, measured by the temperature of the steel grit exiting the dryer 420) measured to exceed a certain temperature, then the modulating valve 424 may be (i) opened or transitioned from a closed state to an open state, (ii) transitioned from a first open state to a second state (e.g., from a 20 degree angle to 40 degree angle or from a 60 percent open state to a 30 percent open state or vice versa), or (iii) from an open state to a closed state to enable heat from the heater 422 to exit into the conduit 430 and out the heat exhaust 428 or be prevented from exiting from the heat exhaust 428. The modulating valve 424 may be a butterfly valve or any other valve type that is capable of operating in high temperatures, such as 700° F. or otherwise that is produced by the heater 422. The conduit 430 may be aligned to be vertically higher than the conduit 426 so as to enable the hot air produced by the heater 422 to exit through the conduit 430 and out the heat exhaust 428 that may be disposed at or above a top of the steel grit dryer 400. It should be understood that a variety of different configurations may be utilized to enable heated air produced by the burner 422 to exit out the heat exhaust 428 prior to entering the dryer 420 from the burner 422 to exit out the heat exhaust 428.

The modulating valve 424 may be controlled (e.g., using a proportional controller) to open and close a certain percentage or angle. The angle may control how much hot air is able to flow through the conduit 426 to the dryer 420. The use of the modulating valve 424 may providing more and/or faster control of heated air that enters the dryer 420 from the heater 422 than is possible by controlling temperature of the heater 422 alone. In an embodiment, the heater 422 may be set to a steady state heat output (e.g., 666K BTUs, 1 M BTUs, 2 M BTUs). However, as understood in the art, many heaters have a maximum temperature change rate, so the use of the modulating valve 424 generally provides more control than controlling temperature of the heater 422.

The configuration of the steel grit dryer 400 may enable the heated air from the heater 422 to flow into the dryer 420 when the modulating valve 424 is in an open state, while the heated air may be prevented from flowing into the dryer 420 when the modulating valve is in a closed state. Because the modulating valve 424 may be controlled to be in any amount (e.g., angle, percentage, etc.) when in the open state, the amount of heat that flows into the dryer 420 may be controlled.

To move air past the heater 422, especially in the case of using a heat exchanger, a fan 432 may be utilized to cause forced draft (FD) airflow to pass past the walls of the heater 422 via conduit 433 and move the heated air through the conduit 426 into the dryer 420 and/or conduit 430 to be released by the heat exhaust 428 and the modulating valve 424 may be varied to control how much heat passes into the dryer 420. Alternatively, the heater 422 may be varied along with the modulating valve 424. The fan 432 draws "clean" air (e.g., air external from the steel grit dryer 400 or at least air not from within the heater 422) to push past the outside wall of the heater 422 to cause the heat to flow into dryer 420. When pressure builds behind the modulating valve in the conduit 430, heat may be released by the heat exhaust 428. The pressure may increase as a result of the modulating valve 424 being closed or in any open state in which the heat produced by the heater 422 builds in the conduit 430. The fan 432 may operate at a constant rate or be altered so as to increase the forced draft airflow to increase, which may cause more heat to be drawn from the walls of the heater 422. The heat exhaust 428 may be a flapper valve or gravity damper that is set to open in response to a certain pressure building within the conduit 430, which may be vertical similar to that of an exhaust stack of a truck with a flapper valve disposed thereon.

Dust from the steel grit may be released as the steel grit is being dried or rotated in the dryer 420. To remove the dust from the dryer 420, the grit dryer machine 400 may include a fan 434 that generates an induced draft airflow that pulls air through a conduit 436, dust collector 438, conduit 440, and the dryer 420. The fan 434 may be larger than the fan 432 as the amount of air that is drawn by the fan 434 is more than the amount of air that the fan 432 is to push. For example, if the dryer 420 includes a 15 foot rotating drum, then the fan 434 may be sufficient large to draws air through the entire or majority length of the drum.

In operation, which is further described in FIG. 4B, when the dryer 420 is being operated in a grit dryer mode (i.e., to dry the steel grit), the air is heated to elevated temperatures (e.g., 100 degrees to 900 degrees Fahrenheit), so a temperature of the air before and/or after the inlet and/or outlet of the dryer 420 may be measured and used to feed back to a controller (see FIG. 5) to control the modulating valve 424 in the event that the heated air becomes too high. The temperature within the dryer 420 is generally at a lower temperature than the elevated temperatures generated by the heater 422, such as being between 100 degrees and 700 degrees Fahrenheit along the length of the dryer 420. It should be understood that moisture in the steel grit causes the temperature of the heated air to be lowered as a result of the moisture consuming heat energy, while minimal or no moisture in the steel grit will lead to the air temperature to be at a maximum or desired drying temperature. Similarly, temperature of the outside air at the location of the steel grit dryer 400 may also play a role of the temperature of the air within the dryer 420. The dust collector 438 may have filters that have a maximum temperature to which the filters may be exposed. If, for example, the heated air coming from the dryer 420 is sensed to be above a temperature threshold, then the controller may operate the modulating valve 424 to cause heated air to be released by the air vent 428 via the conduit 430 so as to lower the heat of the air that is drawn from the dryer 420 and into the dust collector 438, thereby protecting the filters from being exposed to too much heat and being damaged.

From the dryer 420, a conduit or manifold 442 may direct steel grit into a dropout box 444. The conduit 442 may simply be air or may be a surface down which the steel grit may slide into the dropout box 444. The dropout box 444 may be positioned above a re-entrainment valve 446 that is positioned beneath a conduit 448 to control flow of steel grit that exits the dropout box 444 prior to being re-entrained back into a vacuum hose 450 for delivery to a recycler via another vacuum hose 452 that may be fluidly connected to the vacuum hose 450. The re-entrainment valve 446 may be a pinch valve that squeezes to prevent and un-squeezes to release steel grit from flowing through the conduit 448. Alternatively, the re-entrainment valve 446 may be a double or triple butterfly valve (operating as an airlock), slide valve, or any other valve that may be utilized to separate ambient air pressures from vacuum air pressures, as further described herein. From the pre-classifier 404, a heat process vacuum bypass path 454 in the form of a conduit (e.g., hose), for example, may allow for vacuum pressure airflow to extend from the pre-classifier 404 to the vacuum hose 452 so as to avoid the heat process starting from the dryer 420. That is, heated air generated by the heater 422 is prevented from entering the heat process vacuum bypass path 454. It should be understood that the representation of the flow paths including the various conduits, components, airflow paths, steel grit flow paths is illustrative, and that the conduits, components, airflow paths, and steel grit flow paths may be varied, but provide the same, equivalent, or similar function as provided herein. For example, the conduits may simply be interconnections or structural connections between structural components and/or modules, such as the feeder 416 and the dryer 420.

Heat Process Vacuum Bypass Path

The vacuum pressure airflow may come from the vacuum hose 452 and be generated by a vacuum device or vacuum on a steel grit recycling machine to which the steel grit dryer 400 is in fluid communication via the vacuum hose 452 or other form of conduit (e.g., manifold or duct of any material). In an alternative embodiment, an independent or standalone vacuum that is not part of a steel grit recycling machine may be utilized to create the vacuum pressure airflow that extends to the vacuum hose 402 to enable a user to vacuum or pick up steel grit that was blasted onto a structure. The use of the heat process vacuum bypass path 454 may allow a contractor that has a steel grit recycling machine to not have to purchase or rent a separate vacuum and also allow the manufacture of the steel grit dryer 400 not to have to include a vacuum on the vacuum machine, thereby saving cost and space on the steel grit dryer 400. The vacuum pressure airflow extends from the vacuum hose 452 into the heat process vacuum bypass path 454, through the pre-classifier 404, and into the vacuum hose 402.

Air Pressures

The steel grit dryer 400 may be configured to operate with various in-vacuum and out-of-vacuum air pressure levels along with positive (forced draft), negative (induced draft), and neutral (no draft) airflows within each of the in-vacuum and out-of-vacuum air pressure levels. As shown in FIG. 4, vacuum air pressure exists in the vacuum hose 402, vacuum bypass path 454, vacuum hoses 450 and 452, pre-classifier 404, lifter 408, and conduit 410. Ambient air pressure exists in the conduit 414, feeder 416, conduit 418, dryer 420, conduits 433, 430, 426, conduits 440, dust collector 438, conduit 436, fans 434, 442, dropout box 444, and conduit 448. More broadly, the vacuum pressure is separated from the ambient pressure by both the airlock 412 and re-entrainment valve 446 (i.e., between the airlock 412 and re-entrainment valve 446, ambient air pressure is maintained, and in front of the airlock 412 and behind the re-entrainment valve 446, the vacuum pressure is maintained).

Moreover, steel grit may flow along a heat process path and the vacuum pressure airflow may bypass the heat process path without steel grit prior to the dryer 420 and then the steel grit may be re-entrained into the vacuum pressure airflow after the dryer 420 that pneumatically carries the steel grit to a steel grit recycler, for example. More particularly, the vacuum hose 402 may include a vacuum pressure so as to be capable of drawing steel grit therethrough. As the vacuum hose 402 may be 1,000 feet or longer, the vacuum pressure airflow may be sufficiently strong (e.g., 29 inHg or 0.98 Bar) so as to generate a vacuum pressure airflow or vacuum airflow (e.g., greater than 100 mph). The vacuum pressure airflow may extend through the pre-classifier 404 so as to help the steel grit to enter the pre-classifier 404 along with drawing large debris through a debris dropout end of the pre-classifier 404. The vacuum pressure airflow may exit through the heat process vacuum bypass path 454 while leaving the steel grit to be further processed through the heat process path (e.g., between the airlock 412 and the re-entrainment valve 446), as shown.

Despite the vacuum pressure airflow exiting through the bypass path 454, the vacuum pressure itself is maintained through the conduit 406, lifter 408, and conduit 410 until the airlock 412, where the airlock 412 maintains the vacuum air pressure on one side and ambient air pressure on the other side. That is, conduit 410 has a vacuum air pressure (e.g., 29 inHg) and conduit 414 has an ambient air pressure (e.g., 1 Atm). The conduit 414 may have a slight negative pressure airflow so that air is drawn through the conduit, feeder 416, and conduit 418. The slight negative pressure airflow may be generated by the fan 432 that creates a forced draft airflow to the dryer 420 as well as the fan 434 that generates an induced draft airflow through the conduit 436, dust collector 438, conduit 440, and into the dryer 420. The induced airflow by the Fan 434 pulls dust released from the grit into the dust collector 438. As previously described, the re-entrainment valve maintains the ambient air pressure on the side of the dropout box 444 and vacuum air pressure on the side of the vacuum hose 450.

In operation, the re-entrainment valve 446 may be controlled to periodically or aperiodically release dried steel grit into the vacuum airflow in the conduit 450. In controlling the re-entrainment valve 446, it may be desirable to allow sufficient steel grit to flow through the valve such that vacuum pressure is maintained by the aperture defined by the valve 446 by fully or being nearly fully filled by the steel grit that is flowing through the aperture. That is, if the aperture is not filled, the ambient air pressure in the conduit 448 and dropout box 444 would transition to a vacuum air pressure, so having steel grit fill the aperture limits or prevents the vacuum pressure from crossing the re-entrainment valve 446. Such a re-entrainment valve 446 may alternatively be an airlock, but the use of a re-entrainment valve 446 is generally considered to be more efficient for flowing materials between different air pressures. Because the vacuum air pressure is so much lower than ambient, the steel grit is drawn through the re-entrainment valve 446 so control of the valve 446 helps in a controlled manner to ensure that steel grit remains above the valve 446, thereby maintaining a "grit seal." Hence, a sensor, timer, or combination thereof may be used to help ensure that steel grit is maintained within the conduit 448 and/or dropout box 444 while the re-entrainment valve 446 is releasing the steel grit back into the vacuum air pressure airflow in the conduit 450 and/or vacuum hose 452.

It should be understood that while the configuration of the steel grit dryer 400 is that of an inline steel grit dryer, that the steel grit dryer may be configured to operate without being inline in that an onboard vacuum may be utilized such that the endpoint of the steel grit is within the steel grit dryer 400. Such a non-inline configuration of the steel grit dryer may accommodate for smaller steel grit blast operations including those that use a steel grit blasting machine that does not also include a recycler. In such a configuration, other components, such as a steel grit separator (e.g., magnetic drum) may be included with the steel grit dryer components.

Steel Grit Dryer Electrical Control System

With specific regard to FIG. 4B, a schematic showing electrical components for controlling the steel grit dryer 400 are shown. Particularly, a controller 454 that includes one or more computer processors may be in communication with components of the steel grit dryer 400. The controller 454 may execute software 455 that is used to monitor the components and operation of the dryer 400, control operation of the components of the steel grit dryer 400, and/or communicate information to an operator or other computers for monitoring operation of the steel grit dryer 400. The components may include the pre-classifier 404, lifter 408, airlock 412, dryer 420, and other electrical, electromechanical, electro-pneumatic, electro-hydraulic, electro-optical, and other components for use in providing the functionality of the steel grit dryer 404. The controller 454 may be positioned on a printed circuit board 456 with other electrical components. The controller 454 may be in electrical communication with an input/output (I/O) device 458 for use in communicating with components on the steel grit dryer 400 and a communications network (not shown), such as a wireless communications network, via an antenna 459, and memory 460 for use and storing software and data.

In an embodiment, the data may be communicated via a local wireless communications network via the antenna 459 using a local wireless communications protocol (e.g., WiFi®, Bluetooth®) or cellular network using a cellular communications protocol, as understood in the art. It should be understood that more than one antenna and communications protocols may be available for wireless communications. In an embodiment, a local mobile device, such as an electronic device that can be worn on a wrist or clothing, may be in direct communication with the controller 454 so as to enable an operator to control various functions via the electronic device. Such functions may include turning ON/OFF the grit dryer, activating the vacuum break 405a and/or 405b in the event of an emergency, adjusting speed and/or temperature of one or more components of the steel grit dryer, changing a mode of the steel grit dryer (e.g., normal mode to a fast pass mode), and so on.

The controller 454 may be in communication with a sensor bus 462 for receiving data signals from sensors disposed on the steel grit dryer 400, as further described herein. The controller 454 may also be in communication with a control bus 464, which enables the controller to send and receive control signals 465 with the various components on the steel grit dryer 400. It should be understood that the sensor bus 462 and control bus 464 may be analog, digital, combination of analog and digital, and may be an industry standard (e.g., CANN bus) or proprietary bus.

The controller 454 may also be in communication with a human-machine interface (HMI) 466 to enable an operator to control the steel grit dryer 400, including setting up parameters and variables, performing diagnostics, updating software, calibrating modules and sub modules, and/or performing any other functions in accordance with the principles provided herein. The HMI 466 may be a touch screen display, non-touch screen display, remote controller, app executable on a mobile smartphone or other mobile electronic device, or otherwise.

A weather station 468, which may include a variety of sensors that are capable of measuring temperature, pressure, humidity, and any other environmental conditions at the steel grid dryer 400, may be included on the grit dryer 400 and in communication with the controller 454. Data 470 from the weather station 468 may communicated with or be polled by the controller 454. The data 470 may be used in adjusting or otherwise correlating parameters of the steel grit dryer 400. For example, the data 470 from the weather station 468 may be correlated with temperatures within the dryer 420 so that the heater 422 may be adjusted depending upon the atmospheric temperatures, for example.

A number of sensors are disposed at or in the various components of the steel grid dryer 400. For example, temperature sensors (T), pressure sensors (P), load cell (LC) sensors, level sensors (LS), speed sensors (S), inclinometer sensors ($I_x$, $I_y$), and/or other sensors, including the sensors that are built into various components or equipment on the steel grit dryer 400. The temperature sensors (T) may be used to measure temperature at various points in or at the dryer 400.

The pressure sensors (P) may be used to measure air and/or other fluid pressure of the dryer, including both in vacuum pressures and atmospheric or ambient pressures. The load cell (LC) sensors may be configured to measure weight, in this case weight of the grit in the pre-classifier (assuming the weight of the pre-classifier being empty is subtracted from the total weight with steel grit contained therein). The level sensors (LS) may be configured to measure level of steel grit within the dropout box 444. One of the level sensors (LS) may be used to measure a high level of steel grit in the dropout box 444, and another of the level sensors (LS) may be used to measure a low level of steel grit in the dropout box 444. If the level is high, then the controller 454 may control operation of the re-entrainment valve 446 to transition to an open state to release steel grit into the vacuum hose 452, while if the level of the steel grit in the dropout box 444 is low, the controller 454 may control operation of the re-entrainment valve 446 to transition to a closed state, if in an open state, thereby causing steel grit to be collected in the dropout box 444. The speed sensors (S) may be used to monitor speed of various components, including fan speed, drum rotation speed, pre-classifier rotation speed, etc. The inclinometer sensors (Ix, Iy) may be used to determine angle of the machine in both x and y axes, and may cause an interlock of the dryer 400 in the event that the angles of both the x and y axes are not within respective operational angular ranges, as further provided in FIG. 16.

The sensors may make sensor measurements and communicate that data 472 to the controller 454 via the sensor bus 462. As an example, the load cell (LC) sensors may be used to measure the weight in the pre-classifier 404, and the controller may be configured to adjust the system (e.g., slow down or create a vacuum break) in the event that the pre-classifier 404 is filled based on the weight indicating that the pre-classifier is full or stop the lifter 408 based on the weight indicating that the pre-classifier 404 is empty. Other examples of functional operations based on sensor data being measured is described hereinbelow.

Machine Configuration and Ornamental Features

With regard to FIGS. 5A-5K, illustrations of an illustrative steel grit dryer 500 that utilize the principles of operation are shown. The dryer 500 may include an exoframe 502 that provides a rigid body to which the components of the dryer 500 are attached. The exoframe 502 allows for the components to be connected in such a manner that the components are maintained in position relative to one another. A vacuum hose 504 may extend from the dryer 500. A trommel 506, which is part of a pre-classifier, may be positioned at the front of the dryer 500, and be the first component that steel grit encounters when vacuumed into the dryer 500. Beneath the pre-classifier is a trommel trash barrel 508 into which debris that is filtered by the pre-classifier may be dropped.

A hydraulic cooler 510 may be used to cool hydraulic fluid used on the dryer 500. A lifter, in this case a grit auger 512, may extend angularly upwards from the trommel 506 so as to lift the steel grit that exits the trommel 506. A heat exchanger 514 may be positioned alongside the auger 512. A rotary drum 516 into which heated air from the heat exchanger may be positioned beneath the top of the auger such that the steel grit may be dropped into the drum 516 via a conduit or manifold. An exhaust or induced draft fan 518 may be disposed above and/or alongside the rotary drum and be used to draw dust from the drum 516 into a dust collector 520. A dropout box 522 may be positioned beneath the end of the drum 516 so as to catch steel grit that exits the drum 516. A grit re-entrainment valve 524, which enables dried steel grit, to exit from the dropout box 522. A vacuum hose 526 that passes beneath the dropout box 522 and connects to the grit re-entrainment valve 524 may extend to a steel grit recycling or other machine. The steel grit dryer 500 has various ornamental features, such as the exoframe, rotary drum, auger, overall look, etc., that are identifiable as a result of being configured in such a manner.

With regard to FIGS. 5B-5K, different angular views, including right side, left side, rear, front, right front perspective, front left perspective, rear left perspective, rear right perspective, top, and bottom view, respectively, of the steel grit dryer 500 are shown. The ornamental features may be seen throughout the different angles.

Exoframe

Continuing with FIGS. 5A-5K, the exoframe 502 may be configured as a strong structure that prevents twisting or racking of components relative to one another that are attached to the exoframe 502 that mounts to a trailer 503. The trailer includes the components, including a pair of eyebeams (e.g., 10-inch eyebeams) onto which the exoframe 502 may be supported via large springs. Typical mobile equipment use legs that mount equipment to a floor of a trailer. Such leg mounts, however, allow for the components to move relative to one another, especially as the trailer flexes. The exoframe 502 is a welded structure with angular truss members, thereby strengthening the structure. The exoframe 502 enables multiple levels of components to be mounted to a common structure, and because of the exoframe 502 being rigid (i.e., unable to bend) because of the steel structure being welded, each level (e.g., upper and lower) is able to maintain relative position of the components attached to one another. In an embodiment, a sprint or other flexible connection between the trailer and exoframe 502 may allow for the components to be independent of the exoframe 502. In an embodiment, the exoframe 502 may have lift or hoist eyes 528, such as four lift eyes, connected to the top of the exoframe 502, thereby allowing for the exoframe 502 and grit dryer 500 to be gross weight lifted by a crane or other lifting machine. The eyes 528 may be positioned such that the center-of-gravity (COG) of the grit dryer 500 is centrally balanced. As shown, the exoframe 502 provides for a cantilevered configuration (i.e., the components in front of the trailer such that the trommel 506 is able to be supported without bending.

Other Features of the Mobile Steel Grit Dryer

The dryer 500 may further include a master control panel that is configure to provide telematics to an operator remotely located from the dryer 500. The control panel may include a human-machine interface (HMI), but also be configured to collect, process, and communicate data locally and/or remotely to an operator, contractor, municipality, or otherwise. For example, the data may be communicated via a communications network, such as a satellite communications network, so that an operator may see information about the dryer (e.g., operational or non-operation information) on a computer or mobile device.

The trailer 503 may be configured with screw jacks 532 that may be manual or powered. There may be two or more screw jacks 532. In an embodiment, there are four screw jacks 532, one on each corner. If the screw jacks 532 are powered, the screw jacks may be in communication with the controller such that an operator, such as a six-foot man 534, may control operation of the screw jacks 532 via the master control panel 530 or remotely via a remote control electronic device that is in communication with the controller operating the dryer 500.

The dryer 500 may further include a solar panel 536 disposed on top of the exoframe 502 or elsewhere to charge a battery (not shown) on the dryer 500. The battery may be used to power the control panel 530, for example, which may be configured to communicate location information on a periodic or aperiodic basis, even when the dryer is not being used. The dryer 500 may also include a diesel tank 538 for providing fuel to a burner within the heat exchanger 514 when drying steel grit. It should be understood that the dryer 500 may be configured to use other fuel sources, such as gasoline or electricity.

Double Trommel

With regard to FIG. 6A, an illustration of an illustrative pre-classifier configured as a double drum trommel 600*a* is shown. The trommel 600*a* may include an external drum 602 and an internal drum 604 that extends axially within the external drum 602. In an embodiment, the internal drum 604 may be conical shaped with a small diameter end 606 defining an opening that is used as an input into the drum 604 for steel grit being recycled, and a large diameter end 608 that defines an opening for use as an output of the internal drum 604. Because the internal drum 604 is conical, the drum 604 has a downward slope when the central axis of the drum 604 is horizontal. The internal drum 604 may have a sidewall that defines openings 605 along the entire or partial length of the drum 604. The openings 605 may be small enough (e.g., ⅜-inches in length, width, or diameter, but may be slightly larger (e.g., ½-inches or smaller) to allow for the steel grit to pass through the openings 605 so as to fall into the external rotating drum 602.

Debris that is larger than the openings 605 may flow down the wall of the internal drum 604 and eventually pass out the large diameter, open end of the internal drum 604. That is, the large diameter end 608 of the internal drum 604 may enable large debris (e.g., cans, dead birds, nails, etc.) that does not pass through the openings 605 of the internal drum 604 into the tubular, external drum 602 to fall out the open end of the internal drum 604. The one or both of the ends of the internal drum 604 may be vertically aligned with the end(s) of the external drum 602, thereby allowing the steel grit to enter into the internal drum 604 and large debris to exit out of the internal drum 604 without contacting the external drum 602. The external drum 602 may have a solid sidewall except for a series of openings 610a and 610b (collectively 610) that are positioned closer to the end 608 such that steel grit that falls out of the openings 605 of the internal drum 604 into the external drum 602 passes out the openings 610 of the external drum 602. It should be understood that alternative configurations of openings may be used. In an embodiment, guides, flights, or other internal structure (see FIG. 6B) of the external drum 602 may help guide the steel grit toward the openings 610 such that the steel grit falls out of the openings 610 into a drop box (see FIG. 4A) to be re-entrained back into the vacuum airflow, as previously described.

A conduit 612 may enable a steel grit vacuum airflow 614 to draw steel grit upward through the conduit 612 and into walls 616a and 616b (collectively 616) that slow down the steel grit from speeds that may reach upwards of over 100 mph to around 20 mph, thereby allowing for the steel grit to fall out of the vacuum airflow and onto an internal surface of the internal drum 604. The vacuum airflow may continue moving through the internal drum 604 from input end 606 to the output end 608 to help draw lightweight and larger debris that does not pass through the openings 605 to be dropped out of the output opening of the internal drum 604.

With regard to FIG. 6B, an illustration of a cutaway view of the double drum trommel 600 is shown. The internal drum 604 may have lifters 618 that extend axially within the drum 604 to help lift and move the steel grit along the inside surface of the drum 604. As further shown, the external drum 602 may have one or more helical guide(s) 620 that move steel grit that exits from the internal drum 604 to the external drum 602 towards the openings 610. It should be understood that the lifters 618 and guide(s) 620 may have alternative configurations and provide for the same or similar functionality. For example, flights or other shaped members that are connected to the internal surface of the drum(s) 602 and 604 may be utilized. By using a solid portion of the external drum 602 to the openings 610, steel grit that exits the internal drum 604 may be moved to a position over a hopper with steep-angled sidewalls for loading into a lifter (see, for example, FIG. 5) so that the grit, which may be moist, does not stick to the sidewalls of the hopper when being flowed to the lifter.

Load Cells

Figure 7B:
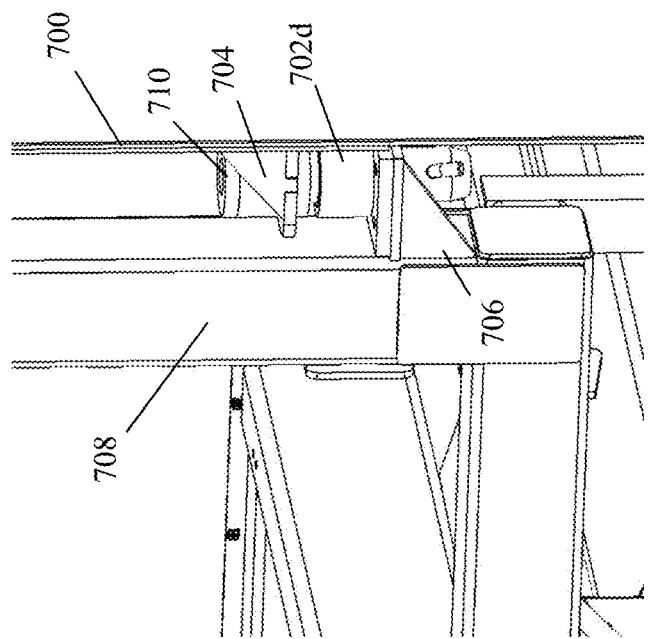
FIGS. 7A-7C are illustrations of an illustrative pre-classifier, such as the double drum trommel of FIG. 6, that utilizes one or more load cells to weigh steel grit within the pre-classifier.
Figure 7A:
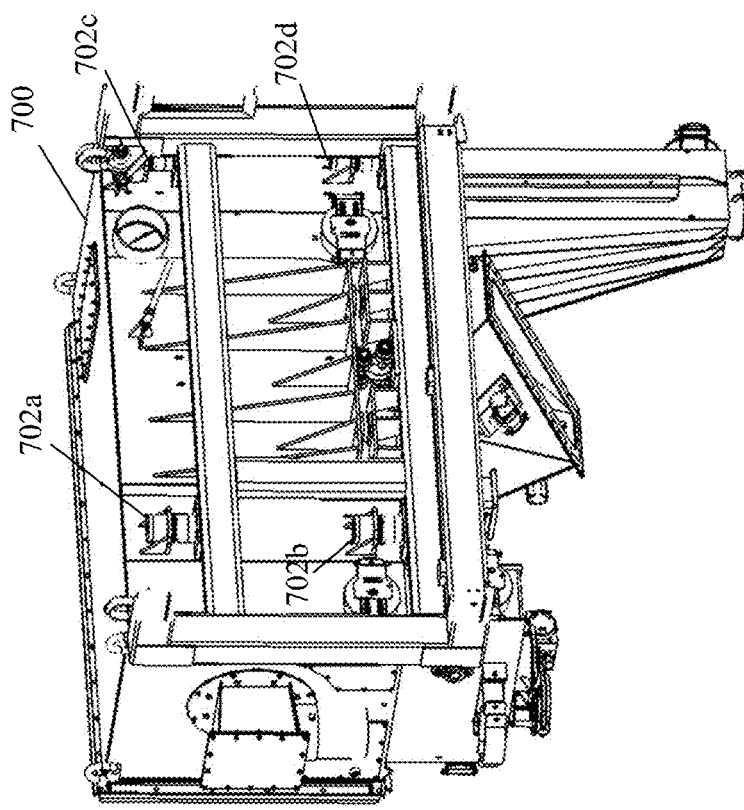
Figure 7C:
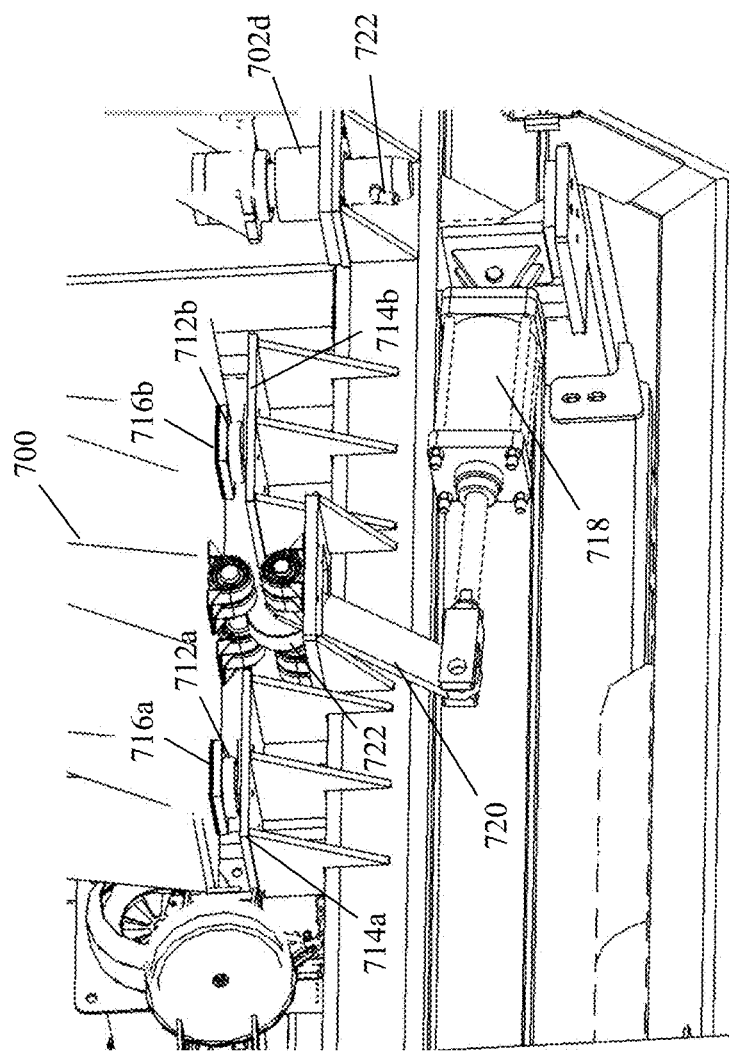

With regard to FIGS. 7A-7C (collectively FIG. 7), an illustration of an illustrative pre-classifier 700, such as the double drum trommel 600 of FIG. 6, that utilizes one or more load cells to weigh steel grit within the pre-classifier 700 is shown. In order to weigh the pre-classifier 700, the pre-classifier has to be able to move vertically as the pre-classifier 700 is filled and unfilled with steel grit. The pre-classifier 700 may have such that the pre-classifier itself is not connected to the exoframe bushings 702a-702d (collectively 702) connected thereto through which rods 704 may be extended. The rods 704 may extend through openings of brackets 706 mounted to vertical posts 708 of the exoframe (see FIG. 7B). A cap 710 may be mounted on the top of the rods 704. The vertical posts 708 may retain the pre-classifier 700 in fixed positions along the x-axis and y-axis, while the brackets 706, bushings 702, and rods 704 allow for the pre-classifier to move along the z-axis.

As shown in FIG. 7C, the pre-classifier 700 is shown to be positioned on load cells 712a and 712b (collectively 712) positioned on surfaces 714a and 714b and below bottom surfaces 716a and 716b of the pre-classifier 700. It should be understood that more or fewer load cells may be utilized, but using at least two provides for redundancy of measurement of weight of the pre-classifier.

As understood in the art, load cells are used to weigh objects. Large load cells may be used to weigh heavy objects. As steel grit fills the pre-classifier 700, the load cells may sense that the weight of the pre-classifier 700 with the steel grit increases, and provide that data to a controller of the steel grit dryer for control of the grit dryer, as further described herein.

One problem with load cells is that the load cells 712 can be damaged during transit of the mobile grit dryer 700. The reason for potential damage is that the load cells have very little movement (e.g., about ¼ of an inch), so if the mobile grit dryer is transported over rough surfaces with holes or otherwise, which is fairly typical in and around jobsites at which the steel grit dryer 700 is to be used. To protect the load cells 712 from damage, a pneumatically or other power source controlled piston 718 may be utilized to cause an arm 720 to drive a cam 722. The cam 722 may be configured to rotate and cause the pre-classifier 700 to be move upwards to a fixed position that prevents the pre-classifier to push down on the load cells 712, thereby minimizing or preventing the load cells 712 from being damaged during transport of the steel grit dryer on which the pre-classifier 700 is mounted.

To control and drive the piston 718, a pneumatic control line (see FIG. 9) that directly or indirectly connects to the piston 718 may be connected to a truck brake service and supply line. Along the control line, a pneumatic switch that indicates that the control line is connected to a truck supply line, thereby causing the piston 718 to engage so as to drive the cam 722 to a locked or mobile position that removes some or all of the weight of the pre-classifier from resting on the load cells 712. If the control line is removed from the truck brake service and supply line, then the piston 718 may disengage so as to lower the pre-classifier 700 to be loaded back onto the load cells 712.

Figure 8:
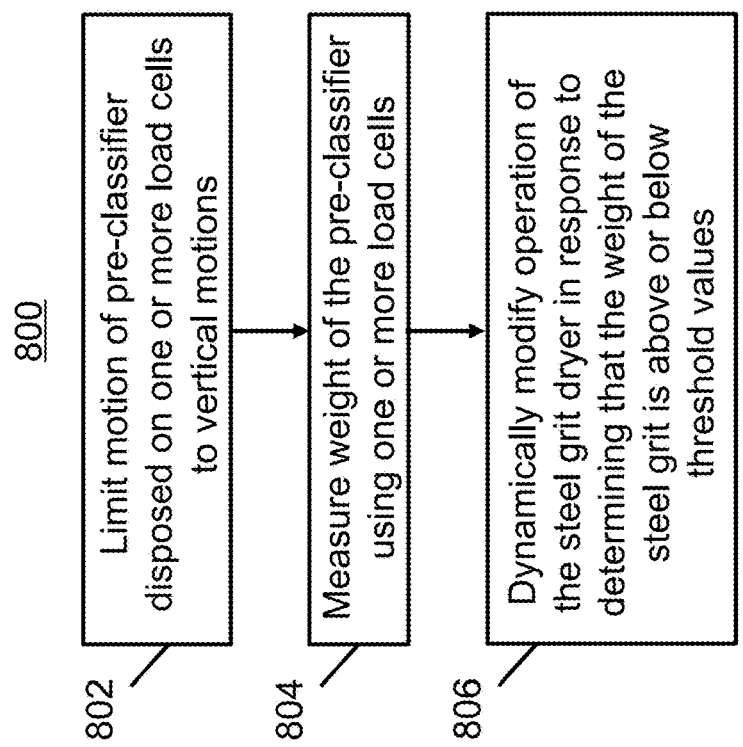
FIG. 8 is a flow diagram of an illustrative process for measuring weight of steel grit within a pre-classifier of a mobile steel grit dryer.

With regard to FIG. 8, a flow diagram of an illustrative process 800 for measuring weight of steel grit within a pre-classifier of a mobile steel grit dryer is shown. The process 800 may start at step 802, where motion of the pre-classifier disposed on one or more load cells to weigh the pre-classifier with steel grit that is contained in the pre-classifier over time is limited to vertical motions. The motion may be limited by fixedly attaching a bracket to an exoframe or other rigid member on a trailer or skid, for example, of the mobile steel grit dryer. A bushing or other component may be fixedly attached to the pre-classifier, and an alignment member (e.g., rod) may be aligned with the bracket and bushing to enable the pre-classifier to move vertically relative to the exoframe or other rigid member, but not move horizontally relative to the exoframe or other rigid member. The process 800 may measure weight of the pre-classifier using the one or more load cells over time (i.e., dynamically) at step 804. The measurement may be performed at the pre-classifier or a processor remotely located from the pre-classifier that receives weight signals from the load cell(s). At step 806, one or more functional operations of the steel grit dryer may be dynamically modified in response to determining that the weight of the steel grit in the pre-classifier is above or below threshold values. The functional operations may include breaking a vacuum pressure to a vacuum hose, opening or closing a valve, stopping operation of one or more components, communicating a notification to an operator, or otherwise.

Figure 9:
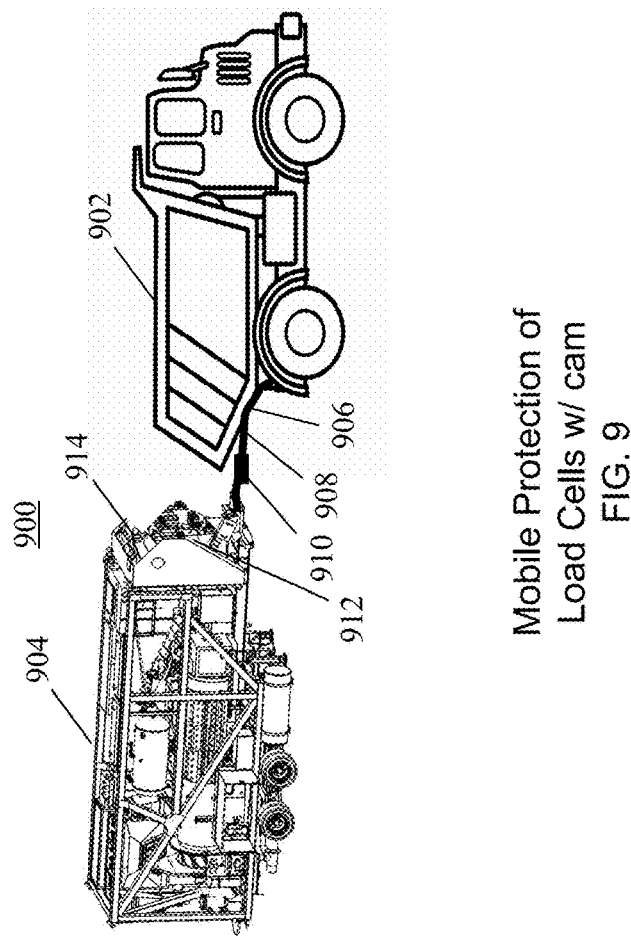
FIG. 9 is an illustration of a scene in which a truck may be connected to a mobile steel grit dryer to pull the mobile steel grit dryer to a jobsite, for example.

With regard to FIG. 9, an illustration of a scene 900 in which a truck 902 may be connected to a mobile steel grit dryer 904 to pull the mobile steel grit dryer to a jobsite, for example, is shown. The truck may have a truck brake service and supply line 906, which typically has two ports, one for providing air for use by air brakes and one for control. A control line 908 may be connected to the line 906 for receiving air. A pneumatic switch 910, which may be located along the control line or on the dryer 904, may be configured to cause a lift mechanism 912, such as a piston or other solenoid to active and deactivate in response to the service and supply line 906 being activated. For example, if the pneumatic switch 910 detects that the control line is connected to the supply line 906, then the lift mechanism may cause a pre-classifier 914 to be lifted, mechanically, electrically, pneumatically, or otherwise, so that force of the pre-classifier is not entirely on load cell(s) positioned to weigh the pre-classifier 914. When the control line 908 is not connected to the line 906 or the line 906 is deactivated, the lift mechanism 912 may be deactivated so that the pre-classifier is resting with its full weight on the load cell(s).

Planetary Gear Box

Rotating drums are often supported by rollers. Because most rotating drums used for drying material, such as grit, dirt, or grains, are not positioned on mobile equipment, the use of rollers provides sufficient stability for the rotating drums. However, for a mobile steel grit dryer, the drum in which the steel grit is to be dried has to be more secure than simply being positioned on rollers. The drum may be 15 feet or longer and weigh several thousand pounds, so security for transporting the rotating drum is necessary to avoid the drum from falling off a trailer or skid when being transported between jobsites.

With regard to FIGS. 10A-10C, illustrations at different angles and zoom levels of a steel grit dryer 1000a, 1000b, and 1000c, respectively (collectively 1000), of a rotating drum 1002 in which steel grit may be dried is fixedly directly or indirectly secured to a structure 1004, such an exoframe, at which the rotating drum is positioned is shown. To secure the rotating drum 1002 to the structure 1004, a three-point mounting system may be utilized. The three-point mounting system may include a planetary gear box 1006 at a first end of the rotating drum 1002 and a pair of trunnion rollers 1008a/b (collectively 1008) disposed beneath a second end (or at least towards the second end) the rotating drum 1002. The rollers 1008 may be motorized or free to rotate, while the planetary gear box may drive rotation of the drum 1002. To secure the planetary gear box 1006, a mount 1010, such as an I-beam, may be fixedly mounted by welding to the exoframe 1004. The mass and strength of the I-beam is sufficiently strong that the drum 1002 is protected from falling off the three-point mounting system during transport. As shown, a dropout box 1012 is positioned prior to the planetary gear box 1006 so as to enable the drum 1002 to drop dried steel grit via the dropout box 1012 via openings defined by the wall of the drum 1002, as previously described.

With regard to FIGS. 10B and 10C, the drum 1002 is shown to be extending through the dropout box 1012. A flange 1014 may be welded to the end of the drum so as to seal the end to prevent steel grit from falling out the end. A connector 1018 that may include one or more components, such as an endplate to prevent steel grit from exiting the drum 1002 and configured to be connected via bolts to the flange 1014, and mounting plate 1020 that may be configured to be bolted to a mounting plat on the planetary gear box 1006. It should be understood that alternative configurations may be utilized to secure the drum 1002 to the planetary gear box 1006 and provide the same or similar function.

Vacuum Bypass Process

Figure 11:
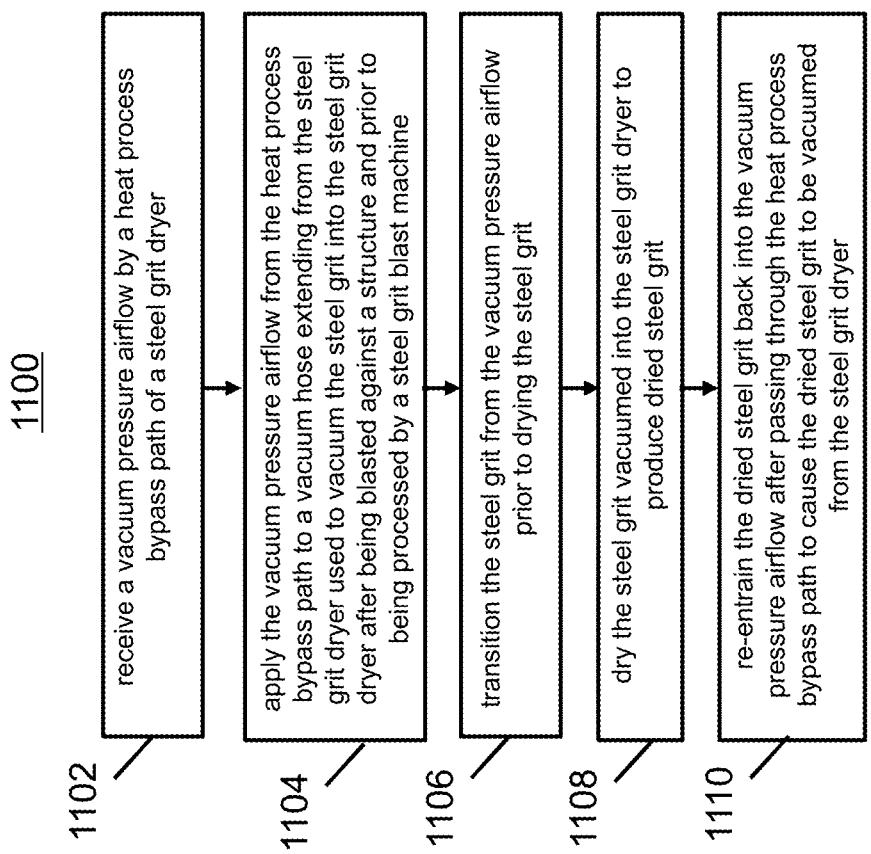
FIG. 11, a flow diagram of an illustrative process for drying steel grit.

With regard to FIG. 11, a flow diagram of an illustrative process 1100 for drying steel grit is shown. The process 1100 may start by receiving a vacuum pressure airflow by a heat process bypass path of a steel grit dryer. In receiving the vacuum pressure airflow, the heat process bypass path may receive the vacuum pressure from a vacuum disposed on a steel grit recycling machine. The vacuum may alternatively be on a steel grit blast machine. Still yet, the vacuum may be a standalone vacuum. The bypass path travels past the heating process such that no heated air generated by a heater enters the heat process bypass path. The bypass path may include a conduit, such as a hose or more rigid structure that extends between the pre-classifier and dropout box at the exit of the dryer (e.g., rotating drum within which heated air is used to dry the steel grit). At step 1104, the vacuum pressure airflow may be applied from the heat process bypass path to a vacuum hose extending from the steel grit dryer used to vacuum the steel grit into the steel grit dryer after being blasted against a structure and prior to being processed by a steel grit blast machine. In other words, the vacuum pressure airflow may travel around the heating process used to dry the steel grit. At step 1106, the steel grit may be transitioned from the vacuum pressure airflow prior to drying the steel grit. The transition process may include using an airlock. At step 1108, the steel grit vacuumed into the steel grit dryer may be dried to produce dried steel grit. At step 1110, the dried steel grit may be re-entrained back into the vacuum pressure airflow after the heat process bypass path to cause the dried steel grit to be vacuumed from the steel grit dryer. In an embodiment, the dried steel grit may be vacuumed to a steel grit recycling machine at which the vacuum may be operating.

Modulating Valve

Figure 12:
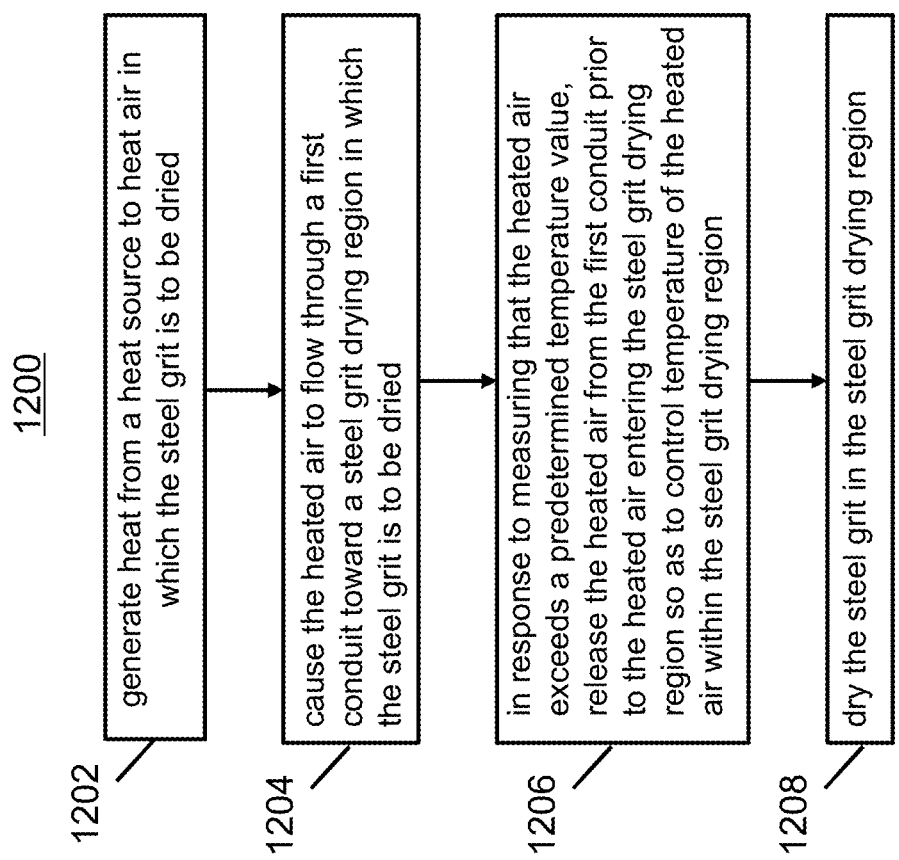
FIG. 12 is a flow diagram of an illustrative process of operating a modulating valve for use controlling temperature used to dry steel grit.

With regard to FIG. 12, a flow diagram of an illustrative process 1200 of operating a modulating valve for use controlling temperature used to dry steel grit is shown. The process 1200 may start at step 1202, where heat from a heat source may be generated to heat air in which the steel grit is to be dried. The heated air may be caused to flow through a first conduit toward a steel grit drying region in which the steel grit is to be dried at step 1204. At step 1206, in response to measuring that the heated air exceeds a predetermined temperature value, the heated air may be released from the first conduit prior to the heated air entering the steel grit drying region so as to control temperature of the heated air within the steel grit drying region. At step 1208, the steel grit may be dried in the steel grit drying region. In an embodiment, the steel grit drying region may be a rotating drum.

Fast Pass

Figure 13:
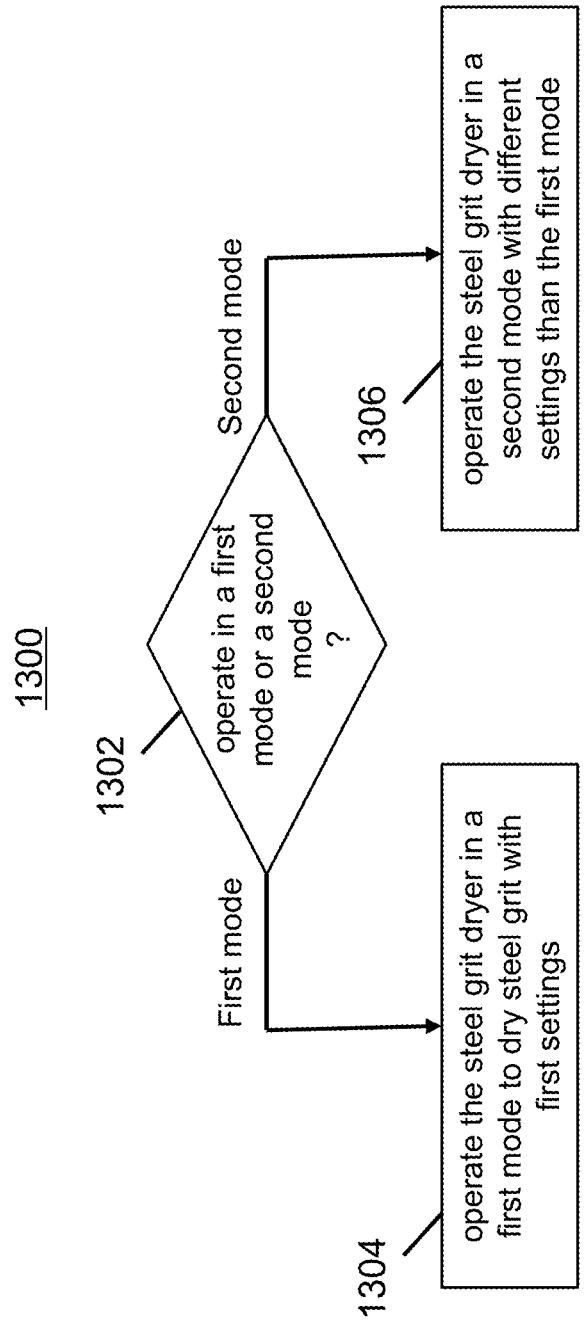
FIG. 13 is a flow diagram for a process for operating a steel grit dryer in different modes.

With regard with FIG. 13, a flow diagram for a process 1300 for operating a steel grit dryer in different modes is shown. The process 1300 may start at step 1302, where a determination may be made as to whether to operate the grit dryer in a first mode or a second mode. It the determination is made at step 1302 to operate the steel grit dryer in the first mode, then the process 1300 continues to step 1304, where the steel grit dryer is operated in the first mode to dry steel grit with first settings. It the determination is made at step 1302 to operate the steel grit dryer in the second mode, then the process 1300 continues to step 1306, where the steel grit dryer is operated in the second mode with different settings than the first mode. The first settings may be to dry the steel grit at a certain temperature and move the grit at a certain speed. The second settings may be to dry the steel grit at the same or different temperature and move the grit at a different speed. Alternatively, the second settings may be to not dry the steel grit, but rather remove dust from the steel grit. Other modes and/or settings are possible.

Pre-Classifying Using a Double Trommel

Figure 14:
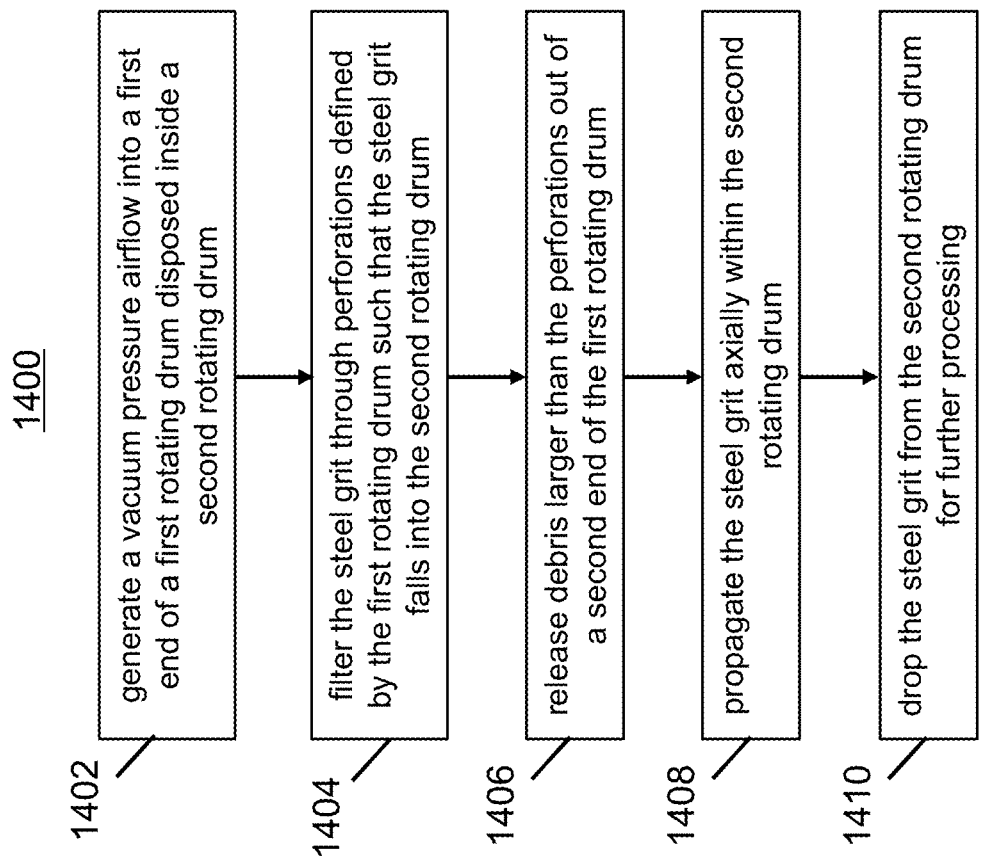
FIG. 14 is a flow diagram of an illustrative process for pre-classifying steel grit.

With regard to FIG. 14, a flow diagram of an illustrative process 1400 for pre-classifying steel grit is shown. The process 1400 may start at step 1402, where a vacuum pressure airflow into a first end of a first rotating drum disposed inside a second rotating drum may be generated. At step 1404, the steel grit may be filtered through perforations defined by the first rotating drum such that the steel grit falls into the second rotating drum. At step 1406, debris larger than the perforations may be released out of a second end of the first rotating drum. In releasing the larger debris, the larger debris may be dropped into a chute for later removal. In an embodiment, the removal may be made after removing a vacuum pressure in the pre-classifier (e.g., a trommel). At step 1408, the steel grit may be axially propagated within the second rotating drum. At step 1410, the steel grit may be dropped or otherwise removed from the second rotating drum for further processing.

Manufacturing a Mobile Steel Grit Dryer with an Exoframe

Figure 15:
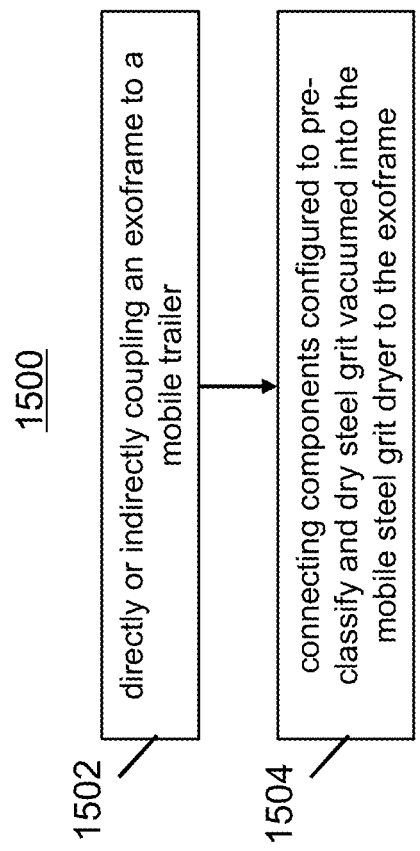
FIG. 15 is a flow diagram of an illustrative process for manufacturing a mobile steel grit dryer with an exoframe.

With regard to FIG. 15, a flow diagram of an illustrative process 1500 for manufacturing a mobile steel grit dryer with an exoframe is shown. The process 1500 may start at step 1502, where an exoframe is directly or indirectly coupled to a mobile trailer. At step 1504, components configured to pre-classify and dry steel grit vacuumed into the mobile steel grit dryer may be connected to the exoframe.

Angle Sense Interlock

In order for any of the mobile steel grit dryers described herein, such as the mobile steel grit dryer shown in FIG. 5A, to operate properly, a certain angle is to be maintained for the rotary drum, trommel, and possibly other components of the grit dryer. The angles include x and angles along the x and y axes. With further reference to FIG. 4B, to measure the angles of the steel grit dryer, inclinometer sensors ($I_x$, $I_y$), and/or other sensor types may be utilized. The controller 454 may be configured to restrict the steel grit dryer from operating in the event that the angles are not within acceptable ranges. For example, the rotary drum may have a transverse angle Ix may be within a range of 0 degrees +/−1 degree, and the longitudinal angle Iy may be within a range of −2 degree to −3 degrees. It should be understood, however, that lower or higher angles may also work, such as −0.5 degrees to −5 degrees. The controller 454 may be configured to notify an operator via the HMI 466 or communication to a wireless device prior to being started that the angle(s) of the dryer 400 are not correct and prevent startup. The controller may further be configured to continuously monitor the inclinometer sensors ($I_x$, $I_y$) during operation of the machine and immediately shut the grit dryer down in the event that the angle of the steel grit dryer falls outside either of the angular ranges. In an embodiment, a notification may be provided to the operator as a warning should the angle determine to change during operation.

To assist the operator with setting the dryer in the proper alignment for operation, the controller 454 may be configured to drive jacks or landing gear 532 (or outriggers, if configured) that may be hydraulic, mechanical, and/or electromechanical. A controller in the control panel 530 or elsewhere may be configured to monitor the angle. If the jacks 532 are manual, then the control panel 530 may generate a tone or communicate a message to a mobile device of an operator to enable the operator to more easily set the height of each of the jacks 532 to bring the grit dryer 500 into compliance. In an embodiment, the controller of the control panel 530 may be configured to automatically set the proper angular level of the trailer 503 so that the transverse and longitudinal angles are within specification for the mobile steel grit dryer to operate (i.e., not be locked out by the controller measuring the angles of the dryer 500). In being automatic, the controller may measure the angles transverse and longitudinal angles and automatically raise or lower the screw jacks 532 until the angles are within the proper ranges, as provided herein. In an embodiment, if it is determines that an angle is outside an acceptable angular range, the controller may be configured to shut down one or more functions of the steel grit dryer, automatically drive the screw jack(s) 532 to correct the angle, and then enable the one or more functions to be available again.

Figure 16:
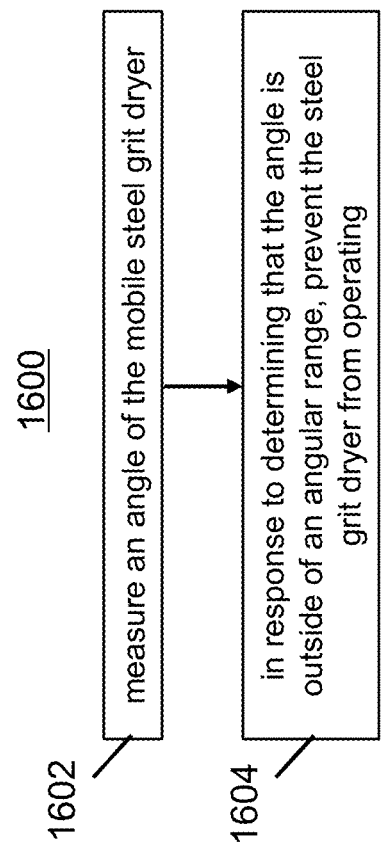
FIG. 16 is a flow diagram of an illustrative process for performing an angle sense interlock.

With regard to FIG. 16, a flow diagram of an illustrative process 1600 for performing an angle sense interlock is shown. The process 1600 may start at step 1602, where an angle of the mobile steel grit dryer may be measured. At step 1604, in response to determining that the angle is outside of an angular range, the steel grit dryer may be prevented from operating. In being prevented, one or more functions or features may be disabled either immediately or ramped down. Once the angle is back in compliance, a controller performing the process may enable the dryer (or the one or more disabled features or functions) to operate again.

Wearable Device

For operators of any sort of large industrial vacuum system, the end of the vacuum hose where recovery takes place is often a substantial distance from the vacuum producing system. This distance can be hundreds to even a thousand or more feet of separation. To achieve efficient vacuum production measured in pounds or tons of material per hour, the vacuum laborer at the end of the hose maintains an optimized balance of air flow and negative static pressure to move the material being recovered by vacuum. This efficiency comes down to maintaining enough air flow, defined by cubic feet of air per minute, velocity of the airflow and static pressure of the air flow. Vacuum laborers holding and guiding the hose learn by trial and error what combination delivers the best balance of material recovery, but the level of proficiency gained is unpredictable. This is typically done without the aid of any gauges or meters to show the actual airflow velocity, volume of air or negative static pressure (vacuum). Yet on the vacuum producing machine/pump/positive displacement blower, hundreds or thousands of feet away, there is likely a negative pressure gauge that shows the level of negative pressure as it goes up and down based on the material being vacuumed.

There are also other important valves, specifically the vacuum break valves on the grit dryer, that can be automatically controlled by the grit dryer. These valves can be activated automatically to stop grit flow and/or air and grit flow into and out of the first component, the rotary vacuum pre-classifier that uses a trommel screen to remove oversized materials as they are vacuuming into the unit. The automatic control of these valves is driven by the levels of grit in the trommel hopper, along with a wide variety of other operating or problem conditions as the grit dryer or recycling machine operates.

The problems relate to the vacuum hose operator knowing or not knowing what is happening at the grit recycling machine, in addition to the operators of those machines not knowing what is happening at the end of the hose where the vacuuming is taking place.

When a controlling event occurs at the recycling machine or grit drying machine, such as the vacuum air flow being turned ON or OFF, it can cause safety issues with the operators of the vacuum where material is being recovered. For instance, if the hopper level in the grit dryer or recycler receiving hopper drops, the vacuum break will automatically close and restore powerful vacuum airflows to the vacuum line. If this occurs without warning to the vacuum operators, given the power of the air flow, they can be injured if this catches them with the hose close to their arms, legs or clothing. When the full vacuum force by air flow is restarted, the hose can attach itself to clothing and be very hard to remove.

It is also possible that an operator will want to change the speed, heat setting or some other variable on the grit dryer as they move from wet, to damp to dry grit. It should be understand that the vacuum hose operators cannot sometimes see or even hear the vacuum producer on a recycler or grit dryer as they complete their work. So they are effectively "blind and deaf" to the machine that makes it possible for them to recover material by vacuuming. Their isolation from any visual or audible information complicates their process and eliminates their ability to control it in any way to increase productivity.

To improve operations for operators, the solution to the problems may be twofold.

First, provide the vacuum hose operator with information about the operational status of the recycling machine and/or grit dryer. This will allow them to control the process of material recovery by vacuum in a way that is safe and efficient. Having a method to show the vacuum hose operators what the level of vacuum is in inches of mercury or inches of water column at the pump that is creating the vacuum air flow. The PD blower, fan or turbine could be as much as several thousand feet away from where the material is being vacuumed up. To optimize the smooth flow of material being vacuumed, it is necessary to keep a steady airflow moving through the vacuum line by metering the material being vacuumed into the hose. If this is not done, it is easy to vacuum too much material, which then overloads the vacuum line and stops the flow of air and vacuumed material. If too little is vacuumed, the production volume will be reduced.

The simplest comparison is to the advantage one gains by having a speedometer on a car. With guidance from that instrument, it becomes easy for anyone to drive a car at the legal speed. Second, by giving the vacuum hose operators control over vacuum break valves, grit drying speed and heat settings allows them to control the process in a way that can optimize productivity.

Features—Productivity Gain

The gain that comes from having the bracelet indicate for instance the green color is that a vacuum laborer can be instructed by the color to continue at the same rate until the color might change to yellow, indicating the vacuum level had dropped into a caution zone. Should the light change to red, it indicates the selected vacuum level will have risen to a point where airflow is too low to optimize vacuuming production. It would be evident to the operator that they need to vacuum less material to increase the airflow but not so much that the yellow and then red indicators light on the other side of green.

If the vacuum level is kept in the green range, a steady, consistent and appropriate airflow will increase the tonnage of material that can be moved per hour. Over an entire day of work, the increased production and lack of vacuum plugging will allow workers to vacuum many more pounds or tons of material per minute, hour and day.

Indication for Open Vacuum Break Valve

An additional light and/or sound would indicate that a vacuum break valve on the vacuum system is open, preventing any airflow. This will sometimes occur when the receiving hopper reaches a point of being filled to capacity, at which point it opens, bleeding off all vacuum airflow to the hose, preventing any vacuum recovery from adding more material to the receiving hopper.

Knowing when the vacuum break valve is open or closed is important because when the valve finally closes again, the vacuum airflow will start without warning. Should a worker put their hand over the end of the hose to test for airflow at this time, their hand could be broken by the sudden vacuum created at the end of the hose.

The feature may include an industrial duty bracelet, that a worker wears on their arm, with three colors of lights. red, yellow and green. They indication of those lights would be calibrated to illuminate the green light when a selected vacuum level is reached. If the vacuum level goes above that, in a calibrated range, the yellow light comes on. If the vacuum level goes even higher, the red light would be calibrated to illuminate, indicating that vacuum was too high. When the vacuum level is too high, the air flow is reduced, which in turn reduces the amount of material being vacuumed. In a worst case scenario, the vacuum level is driven high to a point where a high volume of waste material is vacuumed into the hose, which then caused a drop in airflow, further causing a plug of material in the hose that could be substantial. The only way this plug is removed, is to hold the vacuum at a high level and/or dump out some of the waste material so that the airflow can be restored.

These signals can also be augmented by audible, visual and other biometric feedbacks to the operator. FIGS. 17A and 17B provide illustrative wearable devices that an operator may use to aid in the feedbacks.

Features

A connection to the recycler and/or grit dryer that provides the vacuum operator with data, in a variety of forms, to a device they are wearing, holding or observing.

A connection to the recycler and/or grit dryer that provides the vacuum operator with the ability to control selected aspects of the vacuum producer.

Structure—Hardware, Software

Hardware—Could take the form of a bracelet made of steel, plastic, rubber or other material that attaches to overalls by a positive securing method such as a wristband, waistband, badge or other form to mount on the human operator. On this is mounted an analog or digital gauge, multicolor LED lights or other display device. Within is contained a battery to power the device.

Function—Sensing, Communicating

Sensing signals sent to it via WIFI or other transmission medium. This could include vacuum level in Hg, condition (open or closed) vacuum break valves.

Displaying data in the form of numerical or other data on the screen. Vaccuum level in Hg shown graphically.

Adjustability of where the lights are calibrated to in Hg, allowing operator to adjust that level to find the optimum vacuum level setting.

Steel Grit Moisture Measurement Tool With Digital Timer And Variable Interchangeable Orifices To Detect Moisture Level

Problem

With the advent of portable steel grit dryers, there is a need by contractors for a simple, easy to use, effective method to determine the moisture content and/or flowability of steel grit particles. Because it will be used on jobsites, in the field, to be effective, it may be simple to use, durable and accurate in measuring the relative moisture content and/or flowability.

Solution

As shown in FIG. 18, the solution may include a scoop tube, round or square, that allows it to easily be filled with grit, leveled off by hand, and then run through the test orifice using an electronic timing device to count down the time it takes to empty the grit through an orifice hole on the bottom. The time it takes to complete this would be compared to a chart of "grit viscosity" that would be correlated to moisture level and the determination of whether it is beneficial to dry the grit or not.

The timing of this could be manual, using start stop buttons like a stopwatch, on a digital timer, or automatic using proximity and optical sensors.

Features

A manual scoop tube, round or square, that can be filled, then turned sideways, allowing the grit to run out and through the testing apparatus with variable orifices. A digital timer would activate when the scoop is turned to dump the grit into the calibrated orifice. This could also be configured in a way that allows the measuring container to then be dumped into the holding container. When completed, the measuring cup can be inserted into the container hopper to reduce the size of the overall tool.

The timer can either be actuated manually or by an inclinometer that senses the tipping or by some other means.

Variable and bolt on orifice plates with differing hole sizes can be used to change the size of the hole used to measure the flowability of the grit and/or moisture content. The connection between a hole size and moisture content/flowability will be determined by testing.

This device can fabricated from weldable materials, steel, aluminum and others, or made out of injection molded plastic.

In normal usage, a person would hold the feed hopper in their left hand, scoop up grit into the measuring cup with the right hand, level off the grit, place the feed hopper on top of the measuring cup, and flip it over. If on automatic, the flip of the feed hopper would initiate timing. Or it could be done manually with start and stop buttons on the digital timer, attached to the side of the feed hopper.

Additional Features a. One hand scoop
b. Digital timer, automatically activated when grit is dumped into measurement chamber
c. Variable orifice plates allow testing for different levels of moisture

Structure—Hardware, Software a. Scoop
b. Digital timer
c. Orifice plates
Function—Sensing, Communicating
a. Measuring volume
b. Timing of emptying

Selection of Orifice For Timing

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

It is claimed:

1. A steel grit processing system, comprising:
    a steel grit dryer in fluid communication with a vacuum of a steel grit blast machine via a conduit within which a vacuum pressure is applied by the vacuum, the steel grit dryer including a heat bypass conduit that bypasses heat produced by a heat source on the steel grit dryer; and
    a hose in fluid communication with the heat bypass conduit, thereby enabling an operator to vacuum steel grit via the hose into the steel grit dryer to dry the steel grit using the vacuum pressure produced by the vacuum.

2. The system according to claim 1, wherein the steel grit dryer includes a pre-classifier that causes the steel grit to be removed from the vacuum pressure.

3. The system according to claim 1, wherein the steel grit dryer is further configured to re-entrain dried steel grit into a vacuum airflow produced by the vacuum after being dried by heated air produced by the heat source.

4. The system according to claim 1, further comprising a conduit between the steel grit blast machine and the steel grit dryer such that the vacuum is in fluid communication with the heat bypass conduit and the hose used to vacuum the steel grit into the steel grit dryer.

5. A steel grit dryer, comprising:
    a heat source configured to heat air in which steel grit is to be dried;
    a first conduit connector to which a conduit that is in fluid communication with a vacuum connects;
    a heat process bypass conduit in fluid communication with the first conduit connector, and arranged to bypass heat produced by the heat source; and
    a second conduit connector in fluid communication with the heat bypass conduit, and configured to enable a vacuum hose used to vacuum steel grit for drying by the steel grit dryer to be connected to and enable an operator to use the vacuum hose to vacuum steel grit into the steel grit dryer to be dried by the air heated by the heat source.

6. The system according to claim 5, further comprising a pre-classifier configured to cause the steel grit vacuumed by the vacuum hose to be removed from the vacuum pressure airflow.

7. The system according to claim 5, further comprising:
    an airlock that transitions the steel grit from the vacuum pressure to ambient pressure; and
    a rotary drum that rotates steel grit in the heated air prior to being re-entrained into the heat bypass conduit.

8. The system according to claim 7, further comprising a pinch valve that gravitationally releases the dried grit back into the vacuum pressure airflow while using the steel grit to form a barrier between the ambient pressure and the vacuum pressure.

* * * * *